US012747778B2

(12) United States Patent
Koc et al.

(10) Patent No.: US 12,747,778 B2
(45) Date of Patent: Sep. 29, 2026

(54) DRIVE DEVICE, DRIVE SYSTEM, CONTROL SYSTEM AND DRIVE MOTOR

(71) Applicant: PHYSIK INSTRUMENTE (PI) SE & CO. KG, Karlsruhe (DE)

(72) Inventors: Burhanettin Koc, Ettlingen (DE); Reinhard Hübner, Waldbronn (DE); Simon Kapelke, Karlsruhe (DE); Hansjörg Luckert-Mcbeath, Karlsruhe (DE)

(73) Assignee: PHYSIK INSTRUMENTE (PI) SE & CO. KG, Karlsruhe (DE)

( * ) Notice: Subject to any disclaimer, the term of this patent is extended or adjusted under 35 U.S.C. 154(b) by 0 days.

(21) Appl. No.: 18/867,396

(22) PCT Filed: May 22, 2023

(86) PCT No.: PCT/EP2023/063679

§ 371 (c)(1), (2) Date: Nov. 19, 2024

(87) PCT Pub. No.: WO2023/222925

PCT Pub. Date: Nov. 23, 2023

(65) Prior Publication Data

US 2025/0334171 A1 Oct. 30, 2025

(30) Foreign Application Priority Data

May 20, 2022 (DE) ..................... 10 2022 112 809.1

(51) Int. Cl.
*F16H 25/20* (2006.01)
*H02N 2/12* (2006.01)

(52) U.S. Cl.
CPC ......... *F16H 25/2006* (2013.01); *H02N 2/126* (2013.01); *F16H 2025/2075* (2013.01)

(58) Field of Classification Search
CPC ................ H02N 2/126; H02N 30/2027; F16H 25/2006; F16H 2025/2075
See application file for complete search history.

(56) References Cited

U.S. PATENT DOCUMENTS 10,161,560 B2 * 12/2018 Li .......................... F16M 13/02
10,488,433 B2 * 11/2019 Sadeghian Marnani .................... G01Q 10/04

(Continued)

FOREIGN PATENT DOCUMENTS

CH 647306 A5 * 1/1985 ............. F16H 25/02
DE 10127444 A1 4/2002

(Continued)

OTHER PUBLICATIONS

German Written Opinion of the International Searching Authority (6 pages).

(Continued)

*Primary Examiner* — Jake Cook
(74) *Attorney, Agent, or Firm* — The Juhasz Law Firm

(57) ABSTRACT

Drive system (S), comprising at least two drive units (1, 2) each for receiving and driving a spindle (90) with a spindle axis (A90), at least one coupling device (K) which elastically couples the two drive units (1, 2) to each other in the direction of the spindle accommodating axis (AA), each coupling device (K) comprising at least one spring device, which, in each case in an unstressed neutral state in which no spindle (90) is accommodated in the drive system (S), holds the two drive units (1, 2) in each case stably at a predetermined distance (D12) and provides a spring travel in each case from the neutral state in mutually opposite directions along the spindle accommodating axis (AA), as well as an adjustment system (A) and drive motor (M).

20 Claims, 9 Drawing Sheets

(56) References Cited

U.S. PATENT DOCUMENTS

Figure 1:
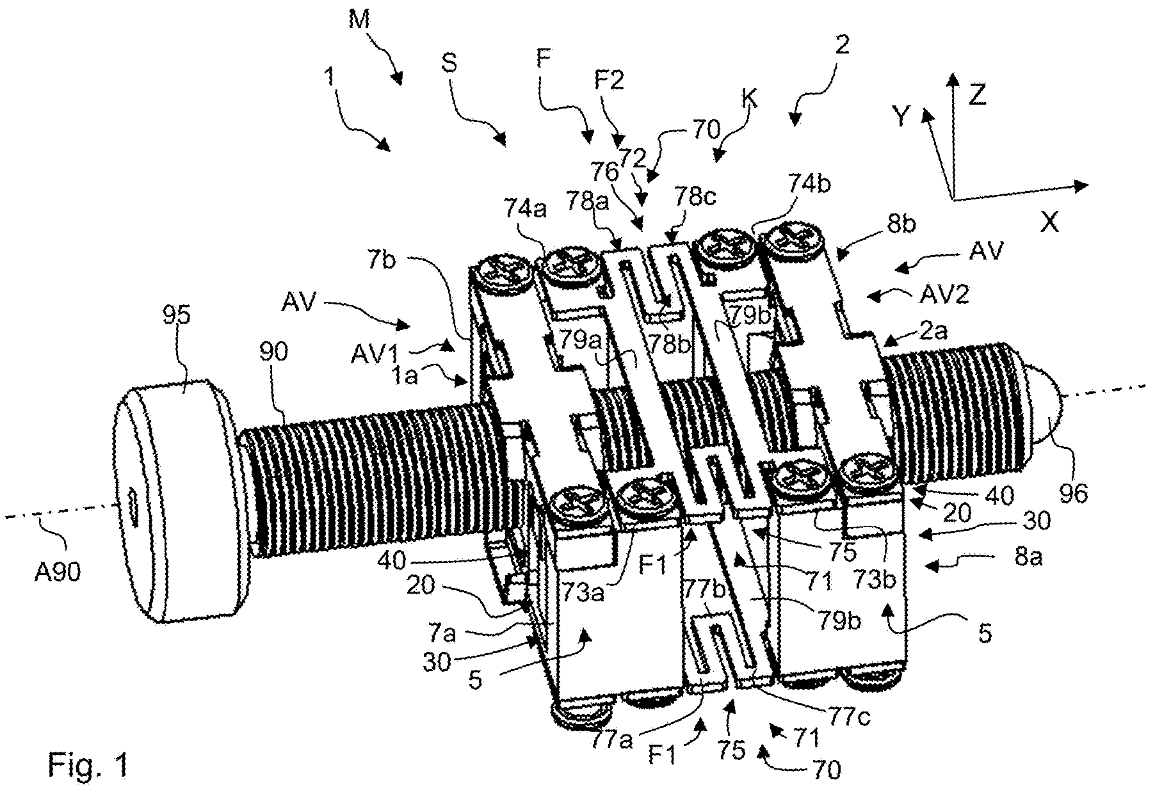

| | | | | |
|---|---|---|---|---|
| 2007/0164635 | A1* | 7/2007 | Witteveen .............. | G02B 7/005<br>310/323.01 |
| 2008/0231970 | A1 | 9/2008 | Henderson | |

FOREIGN PATENT DOCUMENTS

| | | | |
|---|---|---|---|
| WO | 2006000118 | A1 | 1/2006 |
| WO | 2022248711 | A1 | 12/2022 |

OTHER PUBLICATIONS

German ISR (4 pages).
English Translation of German ISR (5 pages).

* cited by examiner

DRIVE DEVICE, DRIVE SYSTEM, CONTROL SYSTEM AND DRIVE MOTOR

The invention relates to a drive device, a drive system for driving a spindle, an adjustment system and a drive motor.

DE 199 09 913 A1 describes a drive system that comprises two bearing elements, each with a piezo element. The two bearing rings form two slide bearings that are pressed against the rotor, allowing the rotor to rotate without play. The piezo elements can cause the bearing ring to rotate in order to drive the spindle. The bearing elements are pressed resiliently against the rotor. The respective bearing ring is mounted on the bearing block via several webs, whereby the webs form flexure joints.

EP1396012B2 describes a piezoelectric drive with two piezo elements that are spaced apart in the axial direction.

Drive devices with a piezoelectric actuator are known from JPH08-251950A, DE10260363A1, EP3691110A1, CN106208806A, EP2676361B1 and U.S. Ser. No. 10/161,560B2.

A drive system with two actuators is known from CN 106208806A, DE60110107T2 and US2011/0109197A1.

U.S. Pat. No. 10,161,560 B2 describes a linear motor with a piezo drive. U.S. Pat. No. 8,059,346B2 describes a linear drive system.

An object of the invention is to provide a drive system and a motor with such a drive system which is an alternative to known solutions.

A further object of the invention is to provide a drive system and a motor with such a drive system, which is advantageous in terms of accuracy and also in terms of manufacture and assembly.

This object is solved with the features of the independent claims. Further embodiments are given in the subclaims referring back to these.

According to the invention, a drive system is provided which comprises: at least two drive units each for accommodating and driving a spindle with a spindle axis, wherein each of the drive units for accommodating a respective section of the spindle comprises a respective spindle space which extends in a respective spindle accommodating axis (AA) through each of the drive units, which extends in the direction of the spindle axis, wherein the at least two drive units stably support the spindle, a coupling device which elastically couples the at least two drive units to one another in the direction of the spindle accommodating axis, the coupling device comprising at least one spring device which extends along the spindle accommodating axis.

In particular, according to the invention, the at least one spring device is realized in such a way that the same in an unstressed neutral state, in which no spindle is accommodated in the drive system, keeps the two drive units in each case stable at a predetermined distance and provides a respective spring travel from the neutral state in opposite directions along the spindle accommodating axis.

The drive units of the drive system have the function of a stator. The use of at least two drive units or stators in the embodiments of the drive system according to the invention has the advantage that the drive units can perform both the function of actuating the spindle and the function of supporting the spindle. In particular, each drive system performs coordinated actuating movements, especially of an actuating component structure for driving the spindle. A separate spindle support device would also rest against the spindle, so that its use would comprise the disadvantage of frictional losses.

The embodiments of the drive system according to the invention preferably do not comprise a separate component that comprises a bearing function of the spindle and no drive function.

In any embodiment of the drive system according to the invention with one or more of the other features otherwise described herein, it may be provided that the at least one spring device, in each case in an unstressed neutral state in which no spindle is accommodated in the drive system, keeps the two drive units stable at a predetermined distance and provides a spring travel in each case from the neutral state in mutually opposite directions along the spindle accommodating axis.

Any embodiment of the drive device according to the invention with a combination of features described herein may comprise the feature that the spring device comprises at least one meander section which is formed transversely to the spindle accommodating axis.

Each embodiment of the drive system according to the invention with a combination of features described herein may comprise the feature that the coupling device comprises two coupling unit connecting parts each with at least one spring section, wherein the coupling unit connecting parts are each connected to the at least two drive units on opposite sides of the spindle accommodating axis when viewed in a direction transverse to the spindle accommodating axis.

The embodiments of the drive system according to the invention with the spring sections of the coupling unit connecting parts may be realized in such a way that the spring sections each comprise a meander section for providing a spring travel in opposite directions along the spindle accommodating axis.

The embodiments of the drive system according to the invention with a coupling device with two coupling unit connecting parts and individual or several of the other features of the drive system otherwise described herein may comprise at least one coupling device with two coupling units, which are each located on opposite sides of the spindle accommodating axis when viewed in a direction transverse to the spindle accommodating axis and extend along one another, wherein each of the coupling units respectively comprises two coupling unit connection parts which are connected to both drive units and each of which comprise a spring section for providing a spring travel in opposite directions to each other, whereby the two coupling units each extend transversely to the spindle accommodating axis and along each other.

The embodiments of the drive system according to the invention with individual or several of the other features of the drive system otherwise described herein may be realized in such a way, that each drive unit comprises a drive device with a spindle space, that each drive unit comprises a frame device, the respective frame devices being coupled to one another by means of the coupling device, that at least one drive device comprises an actuating component structure for receiving and, in particular, contacting and driving a spindle, wherein the actuating component structure partially delimits the spindle space, that the at least one drive device comprises at least one actuator device which, when actuated accordingly, moves the actuating component structure in such a way that a spindle accommodated by the actuating component structure can be driven.

The embodiments of the drive system according to the invention with an actuating component structure and with individual or several of the other features of the drive system otherwise described herein may be realized in such a way that at least one drive device comprises a drive device, which is realized as an electric motor, and the actuating component structure comprises a drive spindle nut, which is rotatably mounted in the drive device and is thereby fixed in the direction of the spindle accommodating axis, wherein the drive spindle nut can be screwed onto the spindle such that, when the actuator device is actuated accordingly, the drive spindle nut and thereby, due to frictional contact with the spindle, the spindle is set in rotation.

Alternatively, the embodiments of the drive system according to the invention with an actuating component structure and with individual or several of the other features of the drive system otherwise described herein may be realized in such a way that at least one drive device comprises at least one actuator device with at least one actuator which is realized as a piezo actuator.

In each embodiment of the drive system according to the invention, at least one and in particular each drive unit thereof may comprise a drive device with an actuator which is a multilayer actuator. When using a multilayer actuator, it may be provided that the respective multilayer actuator is controlled in such a way that the respective multilayer actuator performs a plurality of mutually opposing deformations, e.g. a multiple or plural sequence of an increase in length and a decrease in length, in order to thereby move the actuating component structure accordingly and to set the spindle, against which the actuating component structure rests, in rotation and drive it.

If a drive system according to the invention were to be realized with at least one multilayer actuator and if such a drive system were to comprise a separate support device or drive function with actuating movements that bearings the spindle, whereby the respective multilayer actuator would have to be operated at a higher voltage. When controlling a multilayer actuator with higher voltages, the temperature of the multilayer actuators can increase, which results in an overall decrease in the efficiency of the respective multilayer actuator.

In each embodiment of the drive system according to the invention, at least one drive unit and in particular each drive unit thereof may comprise a drive device with an actuator which is realized in a bulk design.

The embodiments of the drive system according to the invention with an actuating component structure and with individual or several of the other features of the drive system otherwise described herein may be realized in such a way that the drive system comprises a control device which is electrically connected to each of the at least one drive device and which, in an activated state, sends a periodic actuation signal to the respective drive device, which comprises at least one half-period of successive edge sections of different sign, the maximum gradients of which have a minimum difference according to amount to one another, which cause movements of the actuating component structure and, through this, alternately a slip state and a friction state between an actuating surface section of the actuating component structure, which contacts the spindle, and the spindle.

The embodiments of the drive system according to the invention with an actuating component structure and with individual or several of the other features of the drive system otherwise described herein may be realized in such a way that at least one drive device comprises at least one pair of actuator devices, each of which comprises an actuator which is realized as a piezo actuator with an actuator axis, wherein at least one drive device comprises an actuating component structure which can be brought into contact with the surface of a spindle, wherein the actuator axes extend along one another and the extension of each actuator can be reversibly changed along its actuator axis with corresponding electrical control and the change in extension of the actuators sets the actuating component structure in motion and a spindle accommodated by the actuating component structure can be set in rotation.

The embodiments of the drive system according to the invention with at least one pair of actuator devices and with individual or several of the other features of the drive system otherwise described herein may be realized in such a way, that the drive system comprises a control device which is electrically connected to each pair of actuator devices of the at least one drive device and which, in an activated state, transmits to a first actuator device and a second actuator device of the pair of actuator devices in each case a periodic actuation signal which comprises at least one half-period of successive edge sections of different sign, the maximum gradients of which having a minimum difference according to amount from one another, that the actuating component structure comprises at least one actuating surface section which is in contact with the spindle and which, when the control of the respective actuator devices of the pair of actuator devices is operated in each case with the periodic actuation signal, can set the spindle in motion in the circumferential direction, that the periodic actuation signals to the first actuator device and the second actuator device of the respective pair of actuator devices run in antiphase and alter in antiphase between a respective temporary slip state and a friction state, wherein the successive edge sections of different sign of the same half-period of the two periodic actuation signals exert movements of the at least one actuating surface section in the same circumferential direction of the spindle.

The embodiments of the drive system according to the invention with at least one pair of actuator devices and with individual or several of the other features of the drive system otherwise described herein may be realized in such a way, that the actuating component structure comprises a first actuating section comprising a first actuating surface section and a second actuating section comprising a second actuating surface section, that, when the first actuator device of the respective pair of actuator devices is actuated by an actuation signal, it sets the first actuating surface section in motion and, when the second actuator device of the respective pair of actuator devices is actuated by an actuation signal, it sets the second actuating surface section in motion.

In these embodiments, it may be provided in particular, that the first actuating section is connected to an end of a first actuator device and the second actuating section is connected to an end of a second actuator device, in that the actuating surface sections are located opposite one another, in at least a section in each case, and delimit the respective spindle space and contact a spindle contact area of a spindle accommodated by the actuating component structure in order to drive the latter.

According to a further aspect of the invention, a drive motor with a drive system according to an embodiment described herein and a with spindle with a spindle axis is provided, wherein the spindle is located in each spindle space and is coupled to the drive units for driving the spindle.

The embodiments of the drive motor according to the invention with individual or several of the other features of the drive system otherwise described herein can each be realized in such a way, that at least one drive device comprises an actuating component structure which partially delimits the spindle space and is in contact with the spindle for receiving and driving the spindle, that the at least one drive device comprises at least one actuator device which, when actuated accordingly, moves the actuating component structure in such a way that the same drives the spindle accommodated by the actuating component structure.

According to a further aspect of the invention, an adjustment system comprising a drive system according to an embodiment thereof described herein and comprising a slide coupled to the spindle.

A drive device may have:

a drive housing with a housing wall on which at least one actuating surface section extending in the radial direction is realized, an actuating spindle nut, which forms a spindle space with a spindle accommodating axis and defines a radial direction of the drive device, an entrainment device realized as an contact surface section of the actuating spindle nut or as an contact surface section of a component part attached to the actuating spindle nut or connected to the actuating spindle nut, wherein the contact surface section of the actuating spindle nut or the component part and the contact surface section of the housing wall are oriented to face each other, at least one actuator device located between one of the contact surface section of the actuating spindle nut or the component part and of the contact surface section of the housing wall, wherein the longitudinal direction of the at least one actuator device extends along the circumferential direction.

Such a drive device can comprise a restoring device which, from a neutral position of the actuating spindle nut relative to the drive housing, causes a rotary movement in each of the opposite circumferential directions to the neutral position produced by a restoring force, wherein the strength of which depends on the magnitude of the angle of rotation of the respective rotary movement.

According to a further embodiment of the drive device according to the invention, the same comprises:

a drive housing with a housing wall, on which at least one actuating surface section extending in the radial direction is realized, which is oriented in a first circumferential direction of the actuating spindle nut, an actuating spindle nut forming a spindle space with a spindle accommodating axis and defining a radial direction of the driving device, the actuating spindle nut comprising at least one contact surface section oriented along a second circumferential direction of the actuating spindle nut, which is directed opposite to the first circumferential direction, wherein the at least one contact surface section of the actuating spindle nut and a respective one of the at least one contact surface section of the housing wall, which is oriented along the second circumferential direction of the actuating spindle nut, are located facing each other, at least one actuator device which abuts with a first end against the contact surface section of the housing wall and with a second end against the contact surface section of the actuating spindle nut, wherein the longitudinal direction of the at least one actuator device extends from the first end to the second end.

In particular, this embodiment of the drive device can be realized in this way, that the housing wall comprises at least two actuating surface sections extending in a radial direction, one of which is oriented along a first circumferential direction of the actuating spindle nut and another of which is oriented along a second circumferential direction of the actuating spindle nut, which is oriented in the opposite direction to the first circumferential direction of the actuating spindle nut, that the actuating spindle nut comprises at least two contact surface sections, one of which is oriented along the second circumferential direction of the actuating spindle nut and another of which is oriented along the first circumferential direction of the actuating spindle nut, wherein the at least one contact surface section of the actuating spindle nut and a respective one of the at least one contact surface section of the housing wall, which is oriented along the circumferential direction of the actuating spindle nut, are located facing each other, that the drive device comprises a first and a second actuator device (610, 620), each of which abuts with a first end against one of the contact surface sections of the housing wall and with a second end against a respective contact surface section of the actuating spindle nut, wherein the respective contact surface section of the actuating spindle nut and the respective contact surface section of the housing wall, against which a respective actuator rests, lie opposite one another.

The drive device may be realized in such a way, that at least two actuating surface sections of the housing wall extend in a radial direction and are oriented facing away from each other with respect to each of the circumferential directions, that the actuating spindle nut comprises two entrainment devices each comprising a contact surface section extending in the radial direction and oriented facing each other with respect to each of the circumferential directions, wherein an actuating surface section of the housing wall and a contact surface section of the actuating spindle nut face each other, respectively, that the first and a second actuator device, viewed in the direction of the spindle accommodating axis, each abut against a contact surface section of the entrainment devices and against a respective one of the contact surface sections of the actuating spindle nut.

Alternatively, the drive device may be realized such, that at least two actuating surface sections of the housing wall extend in a radial direction and lie opposite one another, that the actuating spindle nut comprises an entrainment device which is located at least in sections between the actuating surface sections of the housing wall and which comprises two contact surface sections which are oriented in opposite directions to one another, that the first and a second actuator device, as viewed in the direction of the spindle accommodating axis, contact a respective one of the contact surface sections of the entraining device on opposite sides of the latter.

The term “along” herein means, in the context of a directional indication mentioned herein, which may in particular also relate to the course of a contour line or a surface or a direction of a component or a structural component such as an axis or a shaft or a center axis thereof, with respect to a reference direction or a reference axis, that a section of the course or the tangent to a respective contour line or respective surface or the direction in an explicitly or implicitly predetermined viewing direction deviates locally or in sections at an angle of at most 45 degrees and in particular of at most 30 degrees from the respective reference direction or reference axis, respectively, to which the respective contour line or respective surface or the direction is related.

The term "transverse" herein means in the context of a directional indication mentioned herein, which may in particular also concern the course of a contour line or a surface or a direction of a component or a structural component such as an axis or a shaft or a central axis thereof, with respect to a reference direction or a reference axis, that a section of the course or the tangent to a respective contour line or respective surface or the direction in an explicitly or implicitly predetermined viewing direction deviates locally or in sections with an angle which is between 45 degrees and 135 degrees, and preferably with an angle which is between 67 degrees and 113 degrees, from the respective reference direction or reference axis to which the respective directional information is related.

The term "distance", in particular between two surfaces, is understood herein to mean in particular the shortest distance.

A "longitudinal direction" or another reference direction of a reference line, such as in particular a central axis or a centrally extending line or a center line of at least one structural component or of a part and in particular of a guideway, results herein in particular as a connecting line of the centers of gravity of the respective smallest cross-sectional areas of the respective structural component along a determined or predetermined direction or between two determined or predetermined ends. In the case that the reference line can be curved or at least partially curved, the reference direction may generally be understood as a local longitudinal direction. However, the reference direction herein may also be understood as the direction of a rectilinearly defined reference line, wherein a line whose attitude relative to the curved line results in the smallest deviation between these lines or the smallest deviation area is used to determine the rectilinear reference line. The same applies in case that a straight reference line is to be derived from a curved line.

The term "elongate" in relation to a component and in particular in relation to a leaf spring or leaf spring arrangement is understood herein to mean that a first length of the component, which is obtained in a first longitudinal direction, is at least 1.2 times greater than a second length of the component, which is obtained in a second longitudinal direction which is perpendicular to the first longitudinal direction and the thickness direction. In particular, the first length can be the longest length in terms of amount. The aforementioned lengths may also result in a reference plane, which may in particular be a center plane.

A longitudinal direction of a component can be understood herein in particular as the aforementioned first longitudinal direction and a width direction can be understood herein in particular as the aforementioned second longitudinal direction.

The term "substantially" in relation to a feature or value is understood herein in particular to mean that the feature contains a deviation of 20% and especially of 10% from the feature or its geometric property or value.

A "curved course" of a line or edge or surface means that the surface, viewed along a reference direction, comprises no corner over the entire width running transverse to the reference direction, i.e. comprises a differentiable course.

In this context, "curvature" of a component or a surface of a component along a direction, e.g. along a longitudinal direction, means that the component curves along this direction. The curvature is visible in its course in a viewing direction transverse to this direction and can be visible, for example, along a width direction of the component.

In this context, "orientation" in relation to a surface and in particular a surface is understood to mean the normal to the respective surface. In the case that the surface in question is not a straight surface but, for example, a curved surface, the normal to a straight surface of the same size can be used to determine the surface normal, the attitude of which relative to the curved surface results in the smallest total deviation.

An "extension" of a surface section is understood to be a direction of a planar surface section which runs along the referenced surface section and, in relation to the latter, if the latter comprises curved sections or sections of different orientation, has an attitude such that the sum of the deviation amounts between the two surface sections is minimal. With reference to a length amount of the extension of a surface section, a length of a fictitious surface section of the same size in a direction to be defined is understood herein, which has an attitude relative to the referenced surface section at which the sum of the deviation amounts between the two surface sections is minimal.

The term "one-piece" in relation to a part or component is understood herein to mean that the part or component is manufactured as a single piece. In this regards, the part or component may be formed from several parts or parts that are connected or coupled or joined together. In this respect, the term "manufactured from one piece" is understood to mean that the part or component is manufactured from a single-piece starting workpiece.

In this context, the term "electromechanical material" refers to a material that undergoes a dimensional change when the material is subjected to a corresponding electrical voltage; for example, an element made of an electromechanical material can undergo a change in length when subjected to voltage.

In this context, the logical link "or" in relation to two alternatives is understood to mean only one or the other of the alternatives, unless otherwise specified.

Figure 2:
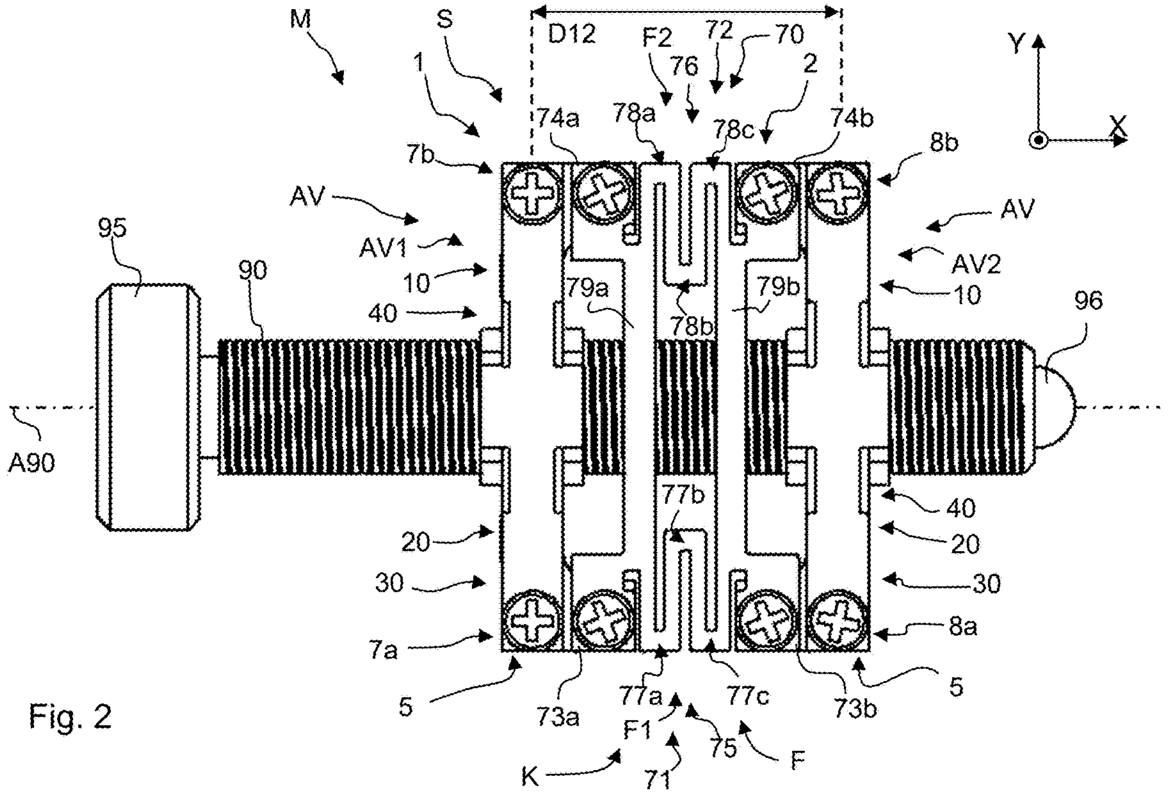
Figure 3:
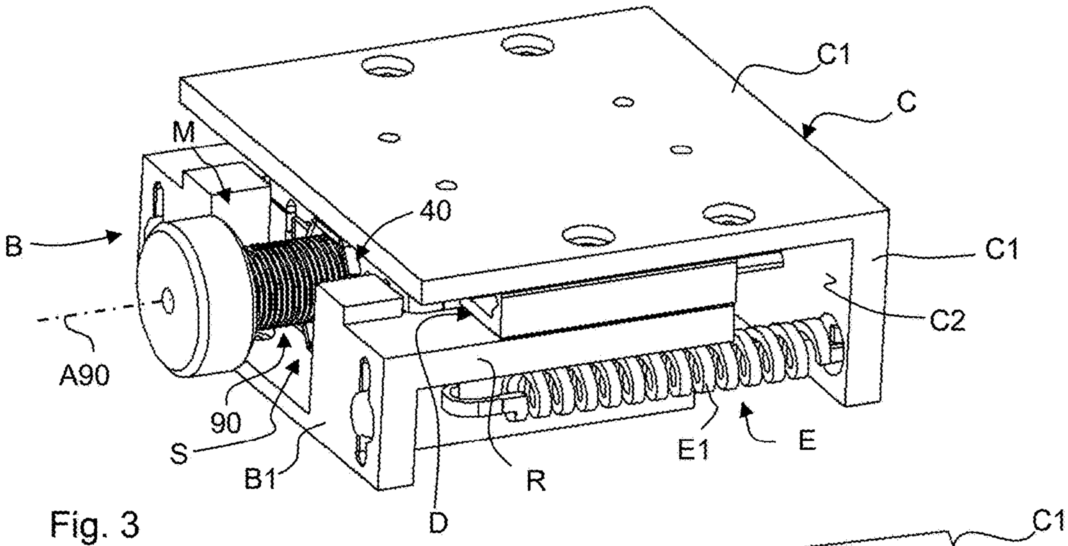
Figure 4:
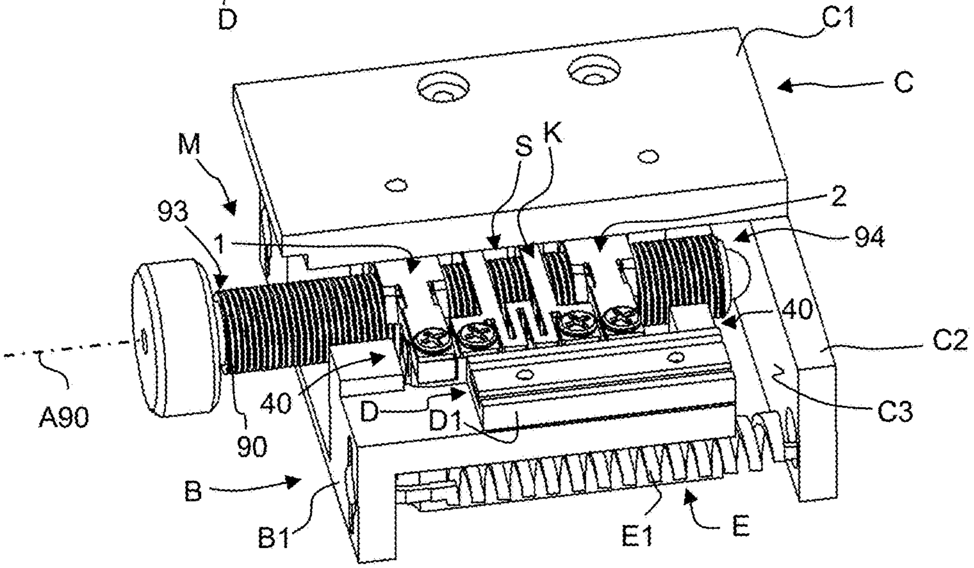
Figure 5:
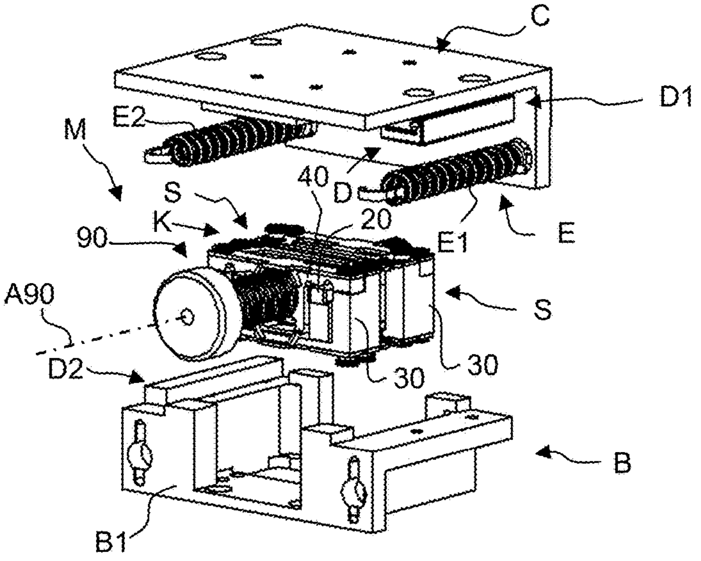
Figure 6:
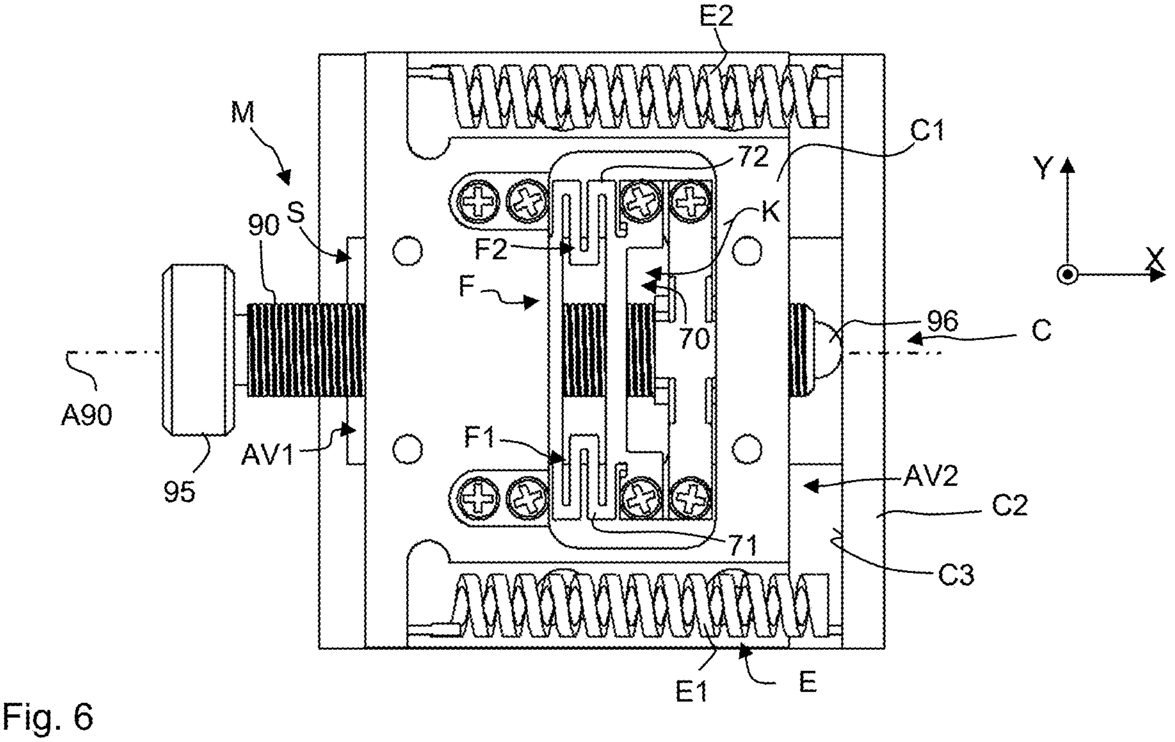
Figure 7:
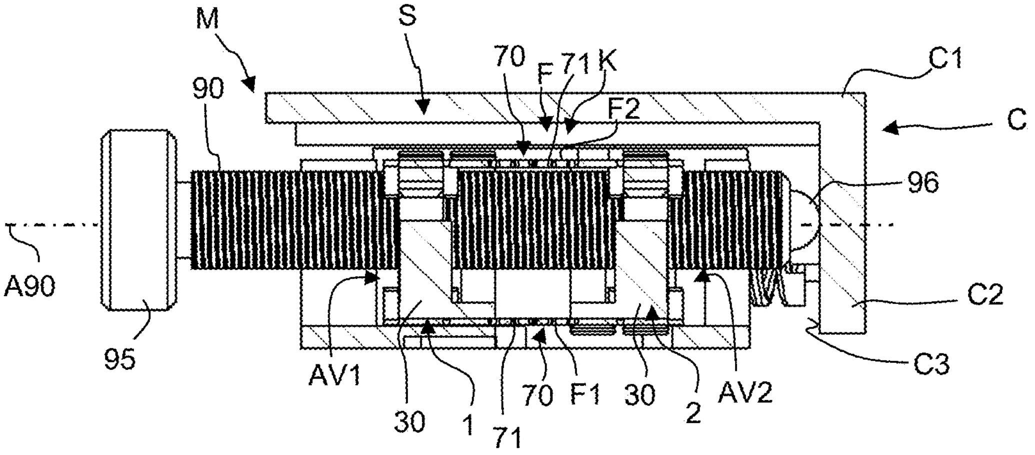
Figure 8:
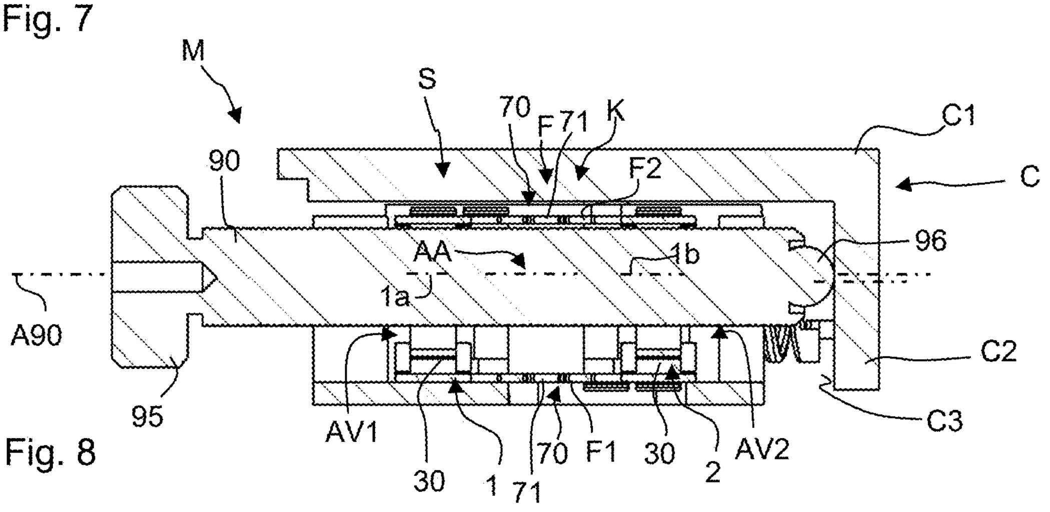
Figure 9:
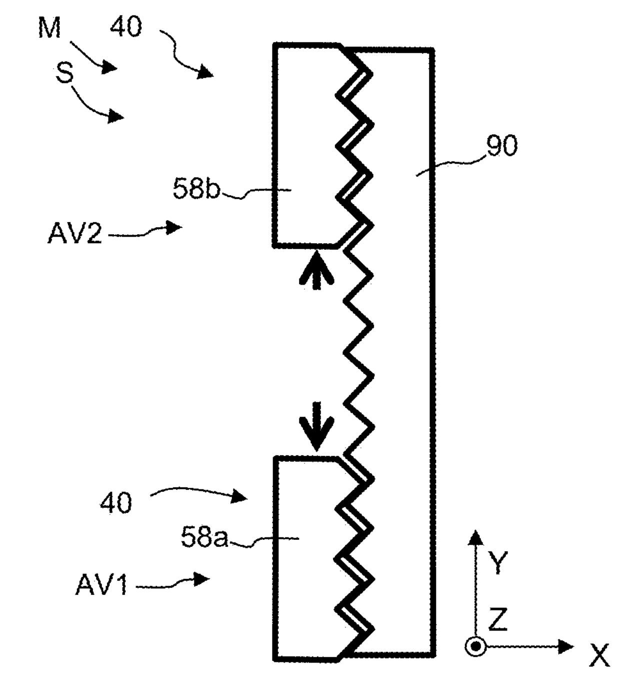
Figure 10:
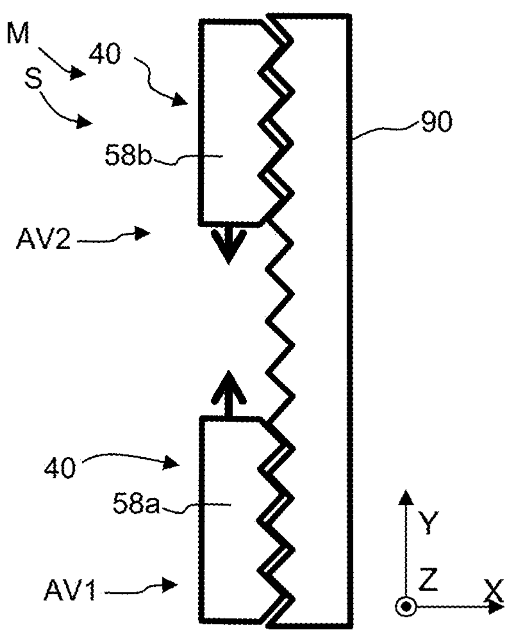
Figure 11:
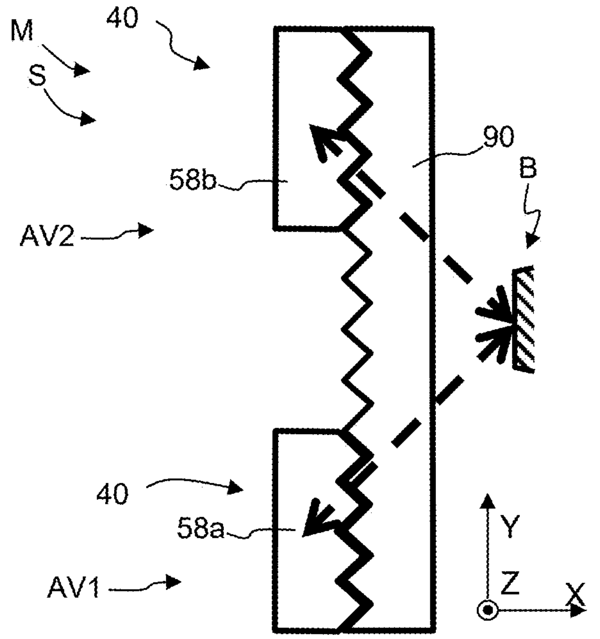
Figure 12:
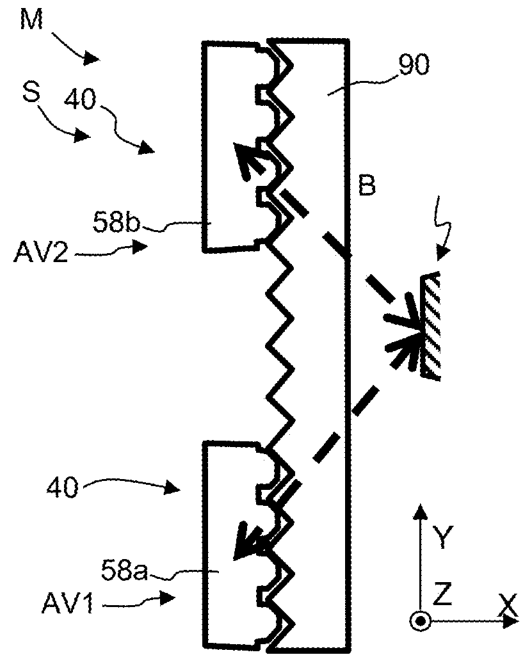
Figure 13:
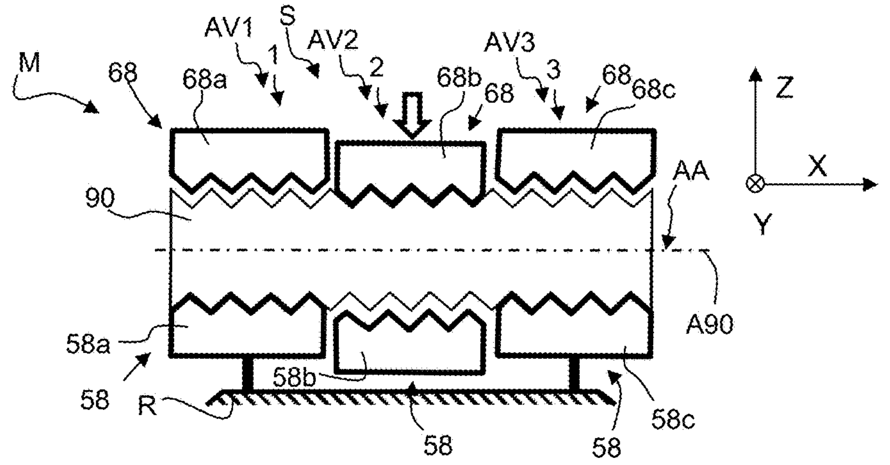
Figure 14:
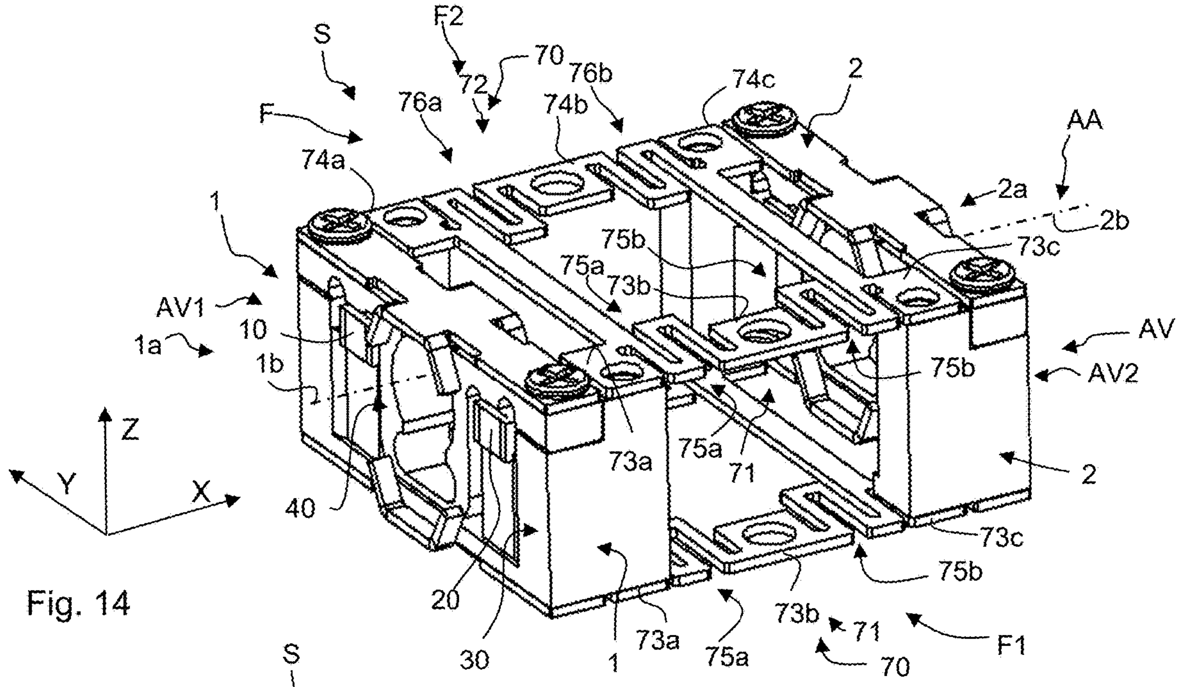
Figure 15:
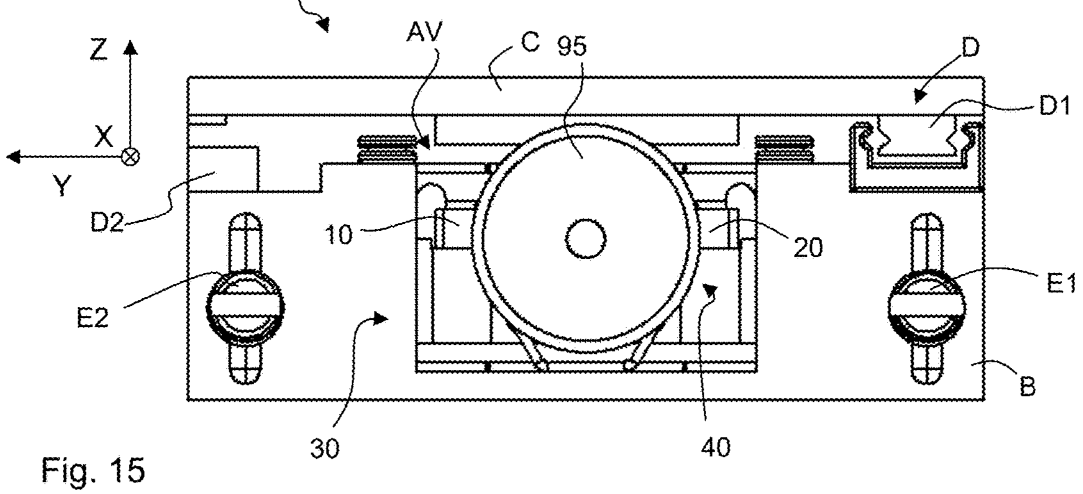
Figure 16:
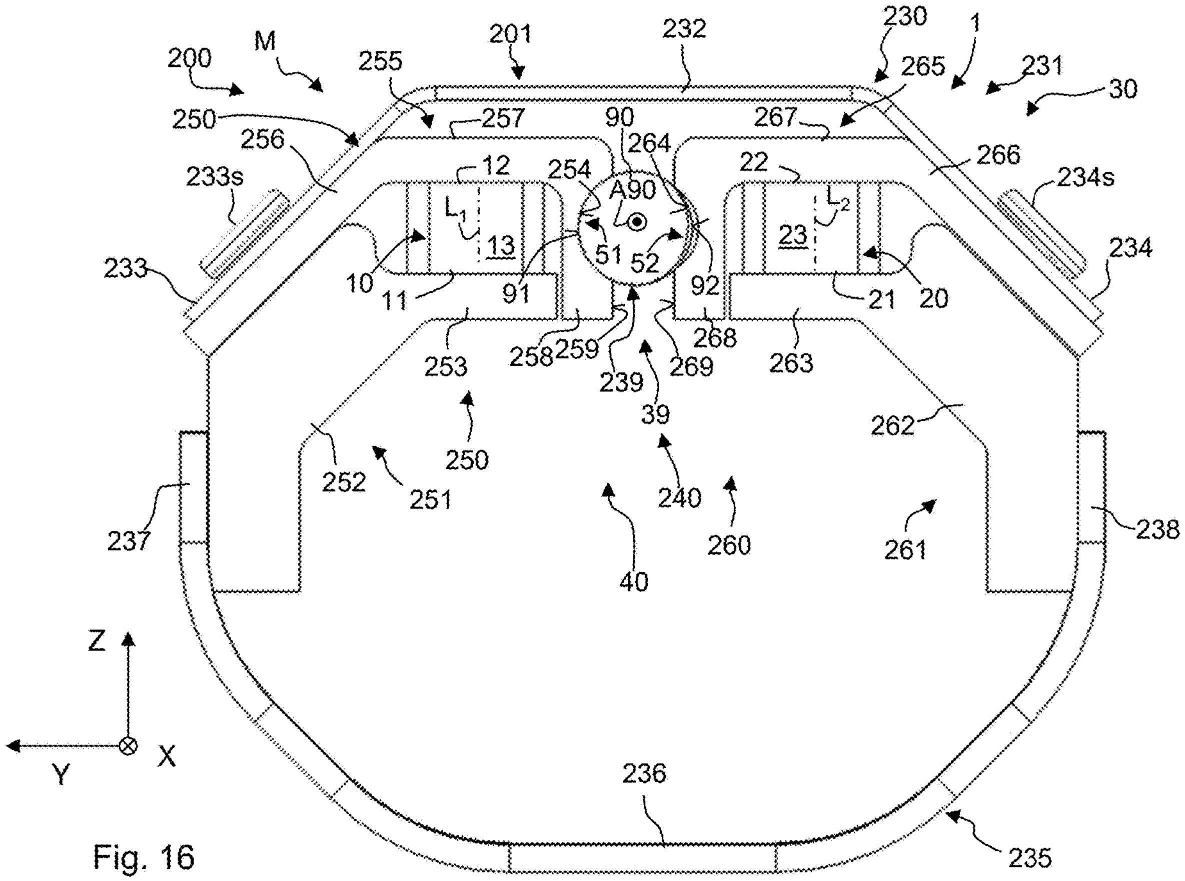
Figure 17:
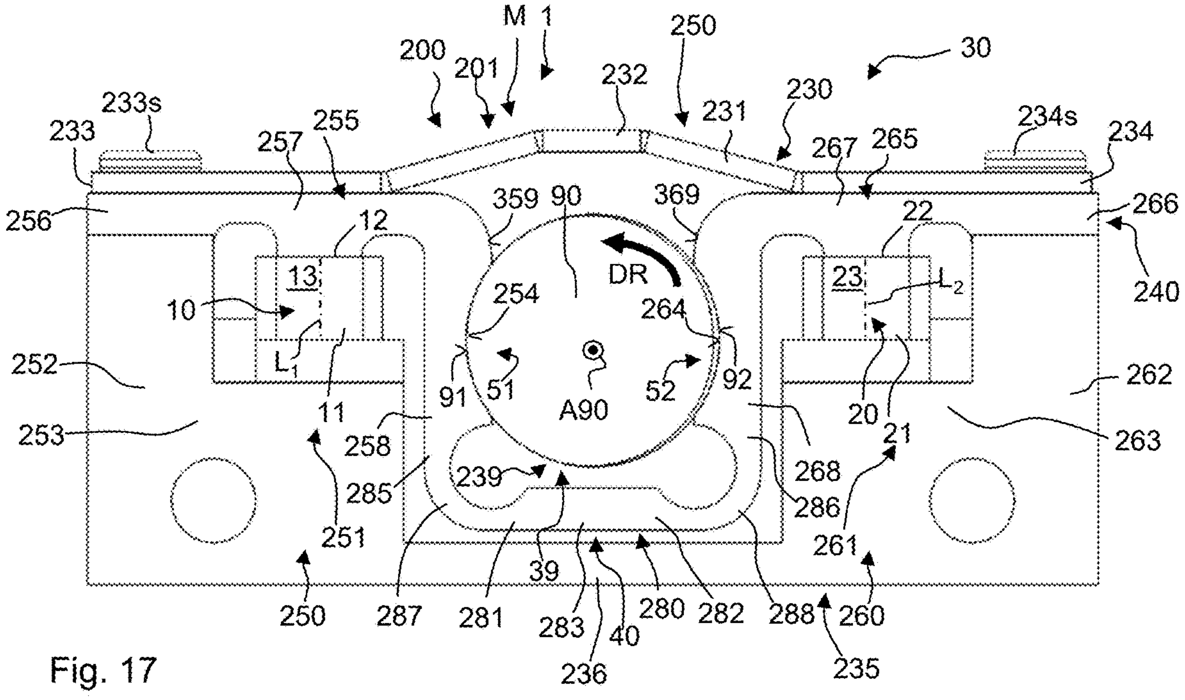
Figure 18:
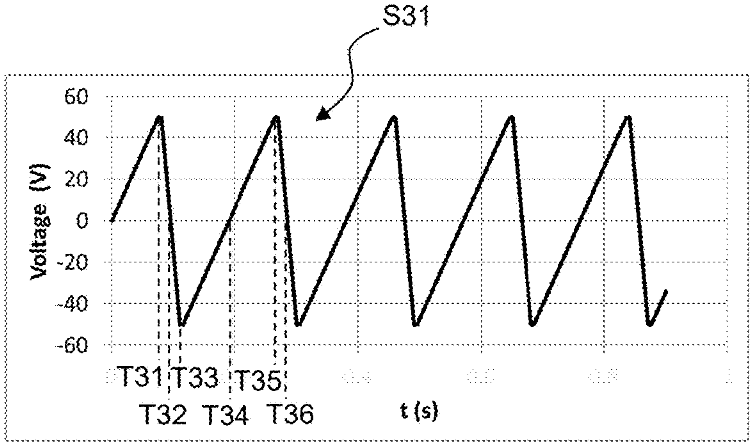
Figure 19:
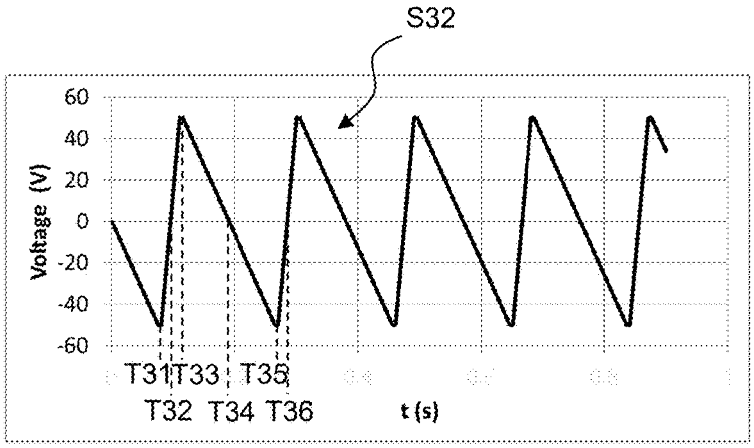
Figure 20:
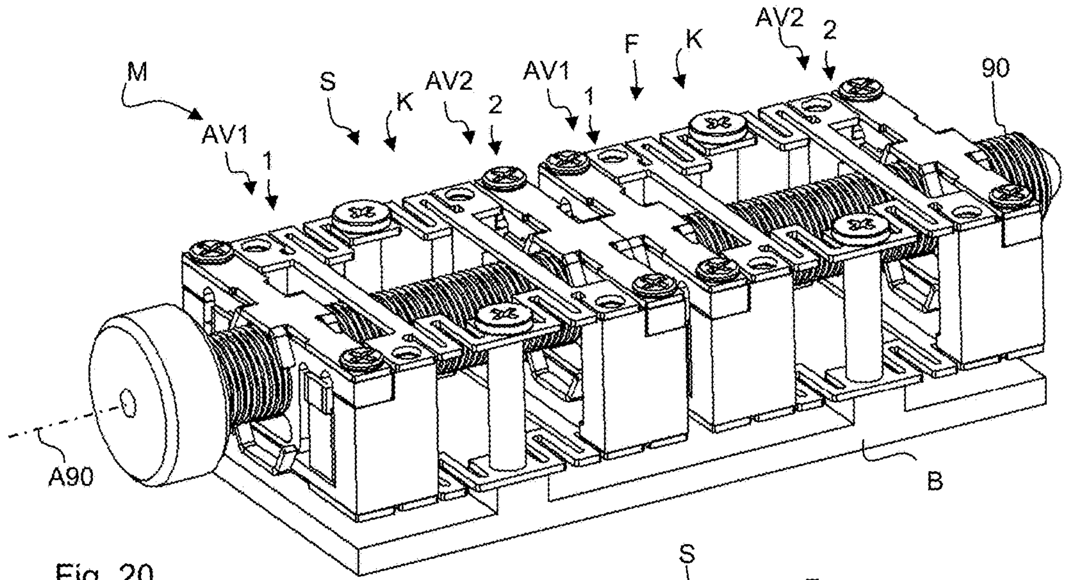
Figure 21:
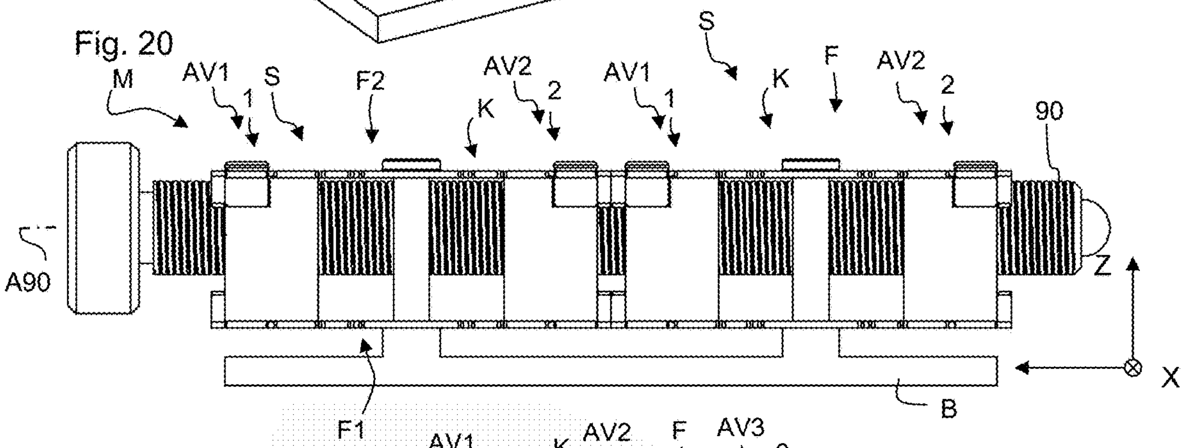
Figure 22:
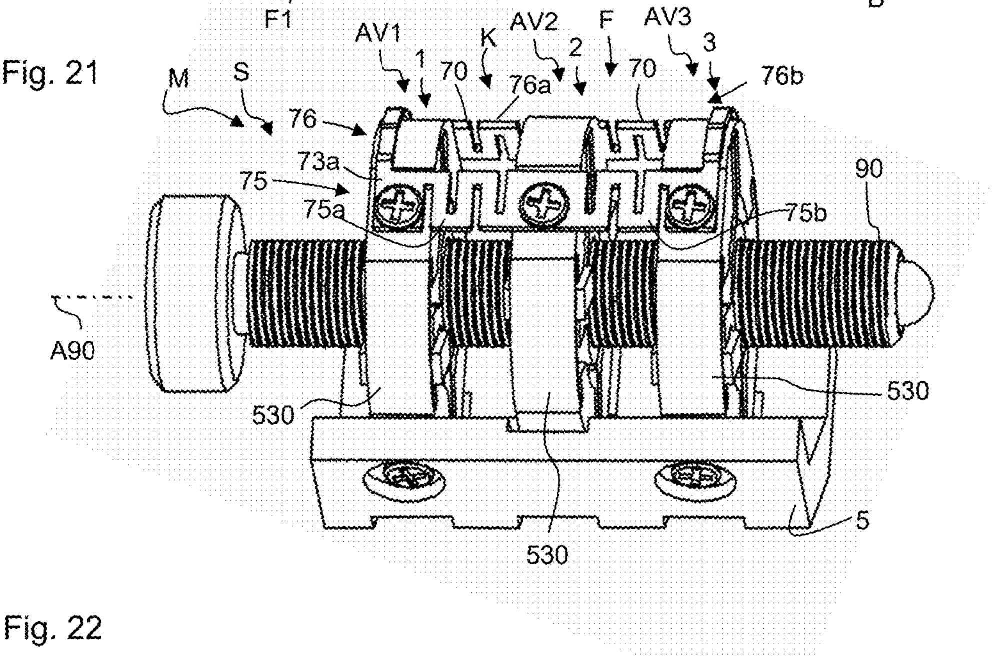
Figure 23:
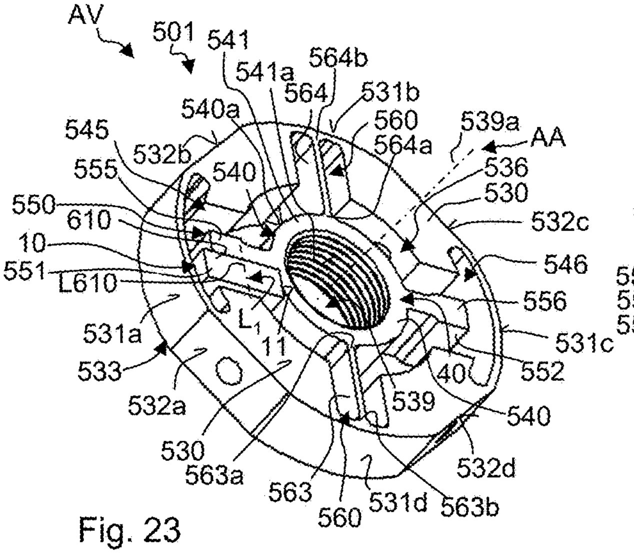
Figure 24:
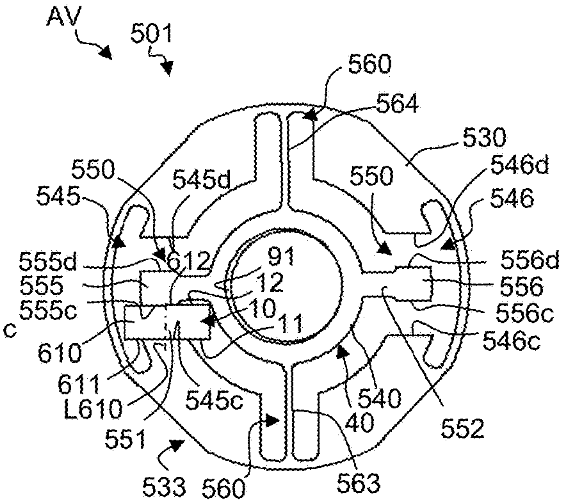
Figure 25:
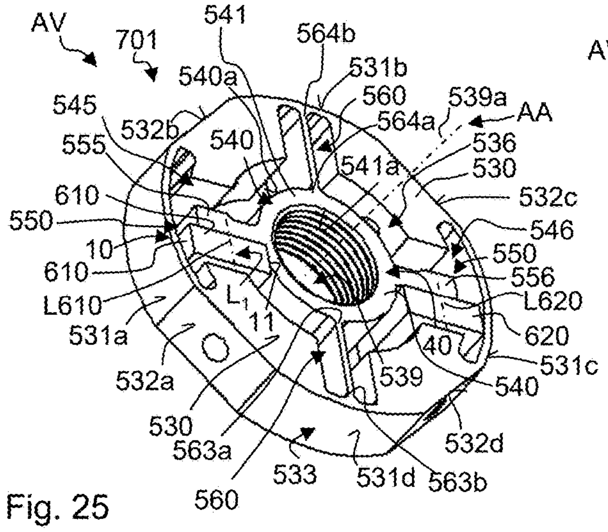
Figure 26:
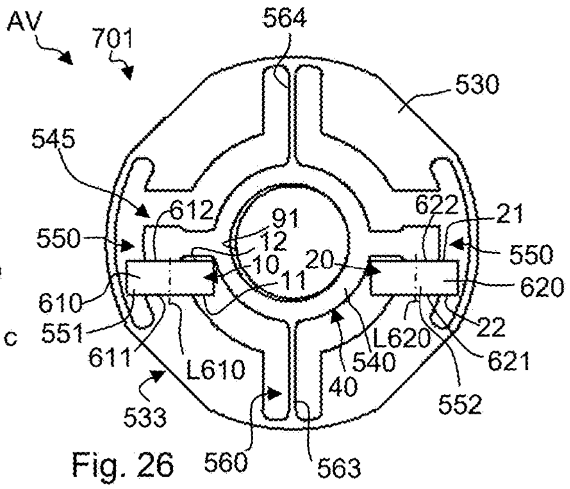
Figure 27:
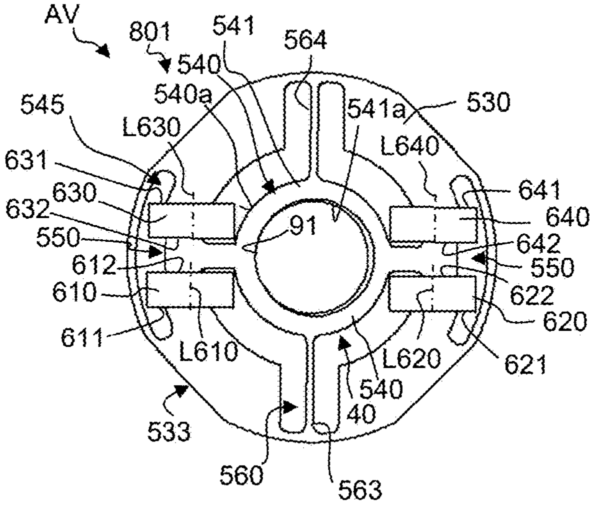
Figure 28:
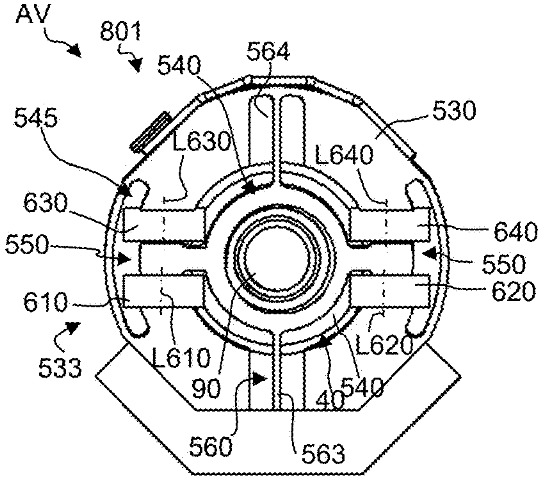

In the following, embodiments of the invention are described with reference to the accompanying figures. Herein, the description of features or components of embodiments according to the invention is to be understood as meaning that a respective embodiment according to the invention, unless this is explicitly excluded, may also comprise at least one feature of another embodiment, in each case as an additional feature of this respective embodiment or as an alternative feature replacing another feature of this respective embodiment. The figures show:

FIG. 1 a perspective view of an embodiment of the drive system according to the invention with two drive devices and a spindle which is accommodated by the latter and driven by the drive system, FIG. 2 a top view of the design of the drive system in FIG. 1 with the spindle, FIG. 3 perspective view of an embodiment of the drive motor according to the invention with the embodiment of the drive system of FIG. 1 with a spindle accommodated by the latter, with a base body and a slide, FIG. 4 a further perspective view of the embodiment of the drive motor according to the invention as shown in FIG. 3, with the slide only partially shown, FIG. 5 an exploded view of the embodiment of the drive motor according to the invention as shown in FIG. 3, whereby the base body, the drive system with the spindle accommodated by the latter and the slide are shown as separate parts, FIG. 6 a top view of the embodiment of the drive motor according to the invention as shown in FIG. 3, with the slide only partially shown, FIG. 7 a sectional view of the embodiment of the drive motor according to the invention as shown in FIG. 3, the section being defined by the line S7-S7 of FIG. 6, FIG. 8 a further sectional view of the embodiment of the drive motor according to the invention as shown in FIG. 3, the section being defined by the line S8-S8 of FIG. 6, FIG. 9 a schematic sectional view of an arrangement of a section of the spindle, a threaded section of the actuating component structure of a first drive device and a threaded section of the actuating component structure of a second drive device of the drive system of FIG. 1, wherein the threaded sections of the actuating component structures abut against the spindle and are arranged by the drive system in a neutral position such that their threaded sections are pressed away from each other with respect to the thread of the spindle, FIG. 10 a schematic sectional view of the arrangement in FIG. 9, whereby the threaded sections of the actuating component structures are pressed together relative to the thread of the spindle, FIG. 11 a schematic sectional view of the arrangement shown in FIG. 9, with the threaded sections of the actuating component structures fitting into the thread of the spindle, FIG. 12 the schematic sectional view of the arrangement of FIG. 9, wherein the threaded sections of the actuating component structures according to FIG. 10 are pressed together relative to the thread of the spindle, the thread form of the threaded sections of the actuating component structures differing from the same according to FIG. 10, FIG. 13 a side view of a further embodiment of the drive system according to the invention, which comprises three drive devices and an additional position fixing device, FIG. 14 a perspective view of an embodiment of the drive system according to the invention for three drive devices, whereby only two drive devices are shown;

FIG. 15 a front view of an embodiment of the drive motor according to the invention with the embodiment of the drive system of FIG. 14, FIG. 16 a further embodiment of the drive device which may be used in a drive system or a drive motor according to the invention, FIG. 17 is a front view of a further embodiment of the drive device, which may be used in a drive system or drive motor according to the invention, FIG. 18 an illustration of an exemplary first electrical actuation signal for activating the first actuator device of the embodiment of the drive device of FIG. 17, FIG. 19 an illustration of an exemplary second electrical actuation signal for activating the second actuator device of the embodiment of the drive device of FIG. 17 in combination with the actuation signal shown in FIG. 18, wherein the spindle is driven in the first actuating direction shown in FIG. 17 with the first actuation signal and simultaneously with the second actuation signal, FIG. 20 a perspective view of an embodiment of the drive motor according to the invention with two exemplars of the embodiment of the drive system of FIG. 14, which are arranged one behind the other in the spindle axis, with a spindle accommodated by the same, with a part of the base body, but without the slide, FIG. 21 is side view of the embodiment of the drive motor according to the invention as shown in FIG. 20, wherein the slide is not shown, FIG. 22 a perspective view of a further embodiment of the drive system according to the invention with three drive devices, with a spindle accommodated by the latter, with a position fixing device which fixes the positions of the two outer of the three drive devices, FIG. 23 a perspective view of an embodiment of a drive device according to the invention which can be used in the drive system of FIG. 22, FIG. 24 a front view of the embodiment of the drive device shown in FIG. 23, FIG. 25 a perspective view of a further embodiment of a drive device according to the invention, which can be used in the drive system of FIG. 22, FIG. 26 a front view of the embodiment of the drive device shown in FIG. 25, FIG. 27 a perspective view of a further embodiment of a drive device according to the invention, which can be used in the drive system of FIG. 22, FIG. 28 a front view of the embodiment of the drive device shown in FIG. 27.

According to the invention, a drive system S is generally provided with at least two drive units each for accommodating and driving a spindle 90 with a spindle axis A90. Through each of the drive units there extends a respective spindle space with a respective spindle accommodating axis, which coincide so that they can accommodate the spindle 90. The spindle mounting axes and the spindle axis A90 also coincide. A spindle accommodating axis is understood herein to be an axis along which a spindle space extends, in which a section of a spindle to be driven by the drive units can be accommodated. At least two drive units or in each case two drive units are resiliently coupled to one another in the direction of or along the spindle mounting axes by at least one coupling device K.

A Cartesian coordinate system is also used in the figures to illustrate the invention.

An embodiment of the drive system S according to the invention is shown in FIGS. 1 and 2. This drive system S comprises two drive units 1, 2. In general, the drive units 1, 2 provided according to the invention each comprise a drive device, to which the reference sign AV is generally assigned herein, and optionally a support device 5, in which the respective drive device AV is received or mounted. The two drive devices shown in FIGS. 1 and 2 are also specifically assigned the reference symbols AV1 and AV2 respectively. A spindle space 1*a*, 2*a*, each with a spindle accommodating axis 1*b*, 2*b*, extends through each of the drive units 1, 2. The spindle mounting axes 1*b*, 2*b* coincide and are also referred to below as spindle accommodating axis AA, which define the same in combination (see also FIG. 8). If a spindle 90 is located in the spindle spaces 1*a*, 2*a*, its spindle axis A90 coincides with the spindle receiving axes 1*b*, 2*b* or the spindle accommodating axis AA. As shown in FIGS. 1 and 2, the support device 5 can be formed from lateral holders between which a respective drive device is arranged and by which the respective drive device is mounted. In this respect, the embodiment of the drive system S according to the invention of FIGS. 1 and 2 comprises: a first drive unit 1 with two first brackets 7*a*, 7*b*, which are laterally disposed with respect to the spindle accommodating axis AA and on which a first drive device AV1 is mounted, and a second drive unit 2 with two second brackets 8*a*, 8*b*, which are laterally disposed with respect to the spindle accommodating axis AA.

In any embodiment of the drive unit used according to the invention, the support device 5 can be integrally formed or manufactured as a single piece, wherein, for example, the lateral brackets 7*a*, 7*b* or 8*a*, 8*b* each form a single component, each of which comprises a connecting part that structurally, i.e. in an inherently stable manner, connects the respective lateral brackets 7*a* and 7*b* or 8*a* and 8*b*.

The spindle 90 may comprise a spindle actuating member 95, for example, attached to an end section of the spindle 90 or formed as an end section of the spindle 90, for manually performing a rotational position or rotational movement of the spindle 90. The spindle actuating part 95 is suitable for manual actuation in order to set the spindle into rotation manually. The spindle 90 may also comprise a spindle adjusting part 96, with which the axial position or axial movements of the spindle 90 can be transferred to a slide C (FIG. 3), which interacts with the drive system S. In the embodiment of FIGS. 1 and 2, the spindle adjusting part 96 is shaped as an end piece which is intended to serve as a stop on an entrainment device or a stop surface of the slide C. Instead of an end piece, the spindle adjusting part 96 can also be realized in another way, for example as a nut which is rotationally fixed relative to the spindle 90 and which is connected to the slide C.

The drive system S according to the invention comprises a coupling device K, which couples at least two drive units together. The coupling device K thus connects two drive units to each other, the drive units being located one behind the other along the spindle accommodating axis AA. According to the invention, the coupling device K can generally be designed as a spring device F. The embodiment of the drive system S according to FIGS. 1 and 2 comprises a coupling device K with two spring devices F1, F2. The coupling device K or the spring devices F1, F2 is or are, according to the embodiment of the drive system S according to FIGS. 1 and 2, each designed as at least one one-piece coupling unit 70, which is essentially realized in the form of a plate. In general, a coupling unit 70 can also be formed from several individual parts.

In embodiments of the drive system S in which the drive units each comprise a drive device and a support device which supports the drive device, the support devices of the drive units may be connected to one another by means of the coupling device K, as shown in FIGS. 1 and 2. Alternatively, in these cases, the drive devices may be connected to each other by means of the coupling device K or both the drive devices and their support devices.

The coupling device K of the embodiments of the drive system S according to the invention comprises at least one spring device F, with which the drive devices AV, which the coupling device K couples in each case, can assume a neutral state with respect to one another, and, when corresponding external forces act on the drive devices AV, can assume displacement states, wherein in the neutral state no external forces or external forces which are negligible with respect to the spring force exerted in each case by the spring device F act on the respective drive devices AV and these drive devices AV assume a neutral state distance with respect to one another. In the adjustment states, the drive devices AV assume distances from one another which differ from the neutral state distance and which, depending on the external forces acting on the respective drive devices AV, can be both adjustment states in which the distances between the respective drive devices AV are smaller than in the neutral state distance and adjustment states in which the distances between the respective drive devices AV are greater than in the neutral state distance.

In particular, the coupling device K provided according to the invention is realized in such a way that the at least one spring device F thereof can shorten or lengthen in the direction of the spindle accommodating axis AA. Thus, the drive devices AV, which the coupling device K couples in each case, move towards or away from each other when the drive devices AV exert corresponding forces on the coupling device K in each case. The forces can thus be either compressive forces or tensile forces, which act from the drive devices, which the coupling device K couples in each case, on the coupling device K and in particular the at least one spring device F, which is provided to provide the aforementioned spring travel. In other words, the at least one spring device F is designed in such a way that, starting from its neutral state, it enables both an increase and a reduction in the effective spring length between the drive devices which the coupling device K couples in each case.

In summary, the coupling device K comprises at least one spring device F, which in each case in an unstressed neutral state, in which no or negligible external forces act on the drive devices AV, in particular when no spindle 90 is accommodated in the drive system S, holds the two drive units 1, 2 stable at a predetermined distance D12 and provides a spring travel in each case from the neutral state in mutually opposite directions along the spindle accommodation axis AA. This respective spring travel occurs in particular when no spindle 90 is accommodated in the drive system S and the drive devices AV each exert corresponding forces on the coupling device K.

In general, each of the drive units of a drive system S provided according to the invention can also be realized without a support device 5. In this case, the drive units 1, 2 or their respective frame device 30 can be held and mounted directly, i.e. without an intermediate component, by means of the coupling device K by coupling them to one another. The respective drive devices are also coupled to each other directly by the coupling device K. As FIG. 1 shows, the frame device 30 can also be realized in one piece with the support device 5

The respective coupling unit 70 is located to the side of the respective spindle space 1*a* or 1*b* and to the side of the spindle 90, as viewed in the direction of the spindle accommodating axis AA or the spindle axis A90, and extends generally along the spindle accommodating axis AA and, in the embodiment according to FIGS. 1 and 2, additionally transversely to the spindle accommodating axis AA. The embodiment of the drive system S according to the invention of FIGS. 1 and 2 comprises a coupling unit 70 with two coupling unit connecting parts 71, 72 which, viewed in the direction of the spindle accommodating axis AA, are each located at one of two opposite ends of the coupling unit 70. The coupling unit connecting parts 71, 72 each comprise two mounting sections 73*a*, 73*b* or 74*a*, 74*b* located one behind the other in the direction of the spindle accommodating axis AA, which are fastened, for example by means of a connecting device, to a frame device 30 of the respective drive device AV, AV1, AV2. The first mounting sections 73*a*, 74*a*, which are located opposite each other with respect to the spindle accommodating axis AA, are fastened to a first drive unit 1 and the mounting sections 73*b*, 74*b*, which are located opposite each other with respect to the spindle accommodating axis AA, are fastened to a second drive unit 2. The two mounting sections 73*a*, 73*b* of a first coupling unit connecting part 71 and the two mounting sections 74*a*, 74*b* of a second coupling unit connecting part 71, 72 are each connected to one another by a spring section 75 and 76 respectively.

According to the illustrations in FIGS. 1 and 2, each spring section 75 or 76 comprises three U-shaped sections 77*a*, 77*b*, 77*c* and 78*a*, 78*b*, 78*c*, respectively, or loop sections, which are arranged one behind the other in the spindle accommodating axis AA and are shaped alternately in opposite directions to form a meander shape, so that the spring sections 75 or 76 are also referred to herein as a meander section. In general, each meander section can also comprise only one loop section or several loop sections. As shown, the loops can be angular or paraboloid or triangular or otherwise shaped.

Depending on the number of drive units that the coupling device K is to connect, the coupling device K or spring device comprises a corresponding number of coupling units 70. In the embodiments of the drive system S of FIG. 22, the coupling device K comprises a coupling unit 70 each with two coupling unit connecting parts 71, 72 which, viewed in the direction of the spindle accommodating axis AA, are each located at one of two opposite ends of the coupling unit 70.

The coupling unit 70 of the embodiment of the drive system of FIGS. 1 and 2 comprises a first bridge section 79*a* and a second bridge section 79*b*, which each extend transversely to the spindle accommodating axis AA and are located one behind the other in the spindle accommodating axis AA, wherein the first bridge section 79*a* connects the mounting sections 73*a*, 74*a* and the second bridge section 79*b* connects the mounting sections 73*b*, 74*b*. The spring sections 75 and 76 are thus located between the bridge sections 79*a*, 79*b* and may in particular connect them to one another.

Each spring section 75 or 76 can also be shaped in such a way that the respective meander section is connected on the one hand to the first bridge section 79*a* or the respective first mounting section 73*a*, 74*a* and on the other hand to the second bridge section 79*b* or the respective second mounting section 73*b*, 74*b* via an intermediate section extending along the spindle accommodating axis AA, wherein the U-shaped section 77*c* or 78*c* is shaped transversely to the spindle accommodating axis AA.

Each coupling unit 70 or one of the coupling units 70 may be realized in a different way, e.g. as a bar structure or grid-shaped or as a cast part, instead of being essentially plate-shaped The coupling unit 70 of the first spring device F1 and the coupling unit 70 of the second spring device F2 are shaped identically to one another in the embodiment of the drive system S according to FIGS. 1 and 2. Alternatively, the coupling unit 70 of the first spring device F1 and the coupling unit 70 of the second spring device F2 can be shaped differently from one another.

In contrast to the described forms of the coupling unit 70, each coupling unit 70 or one of the coupling units 70 can be realized in multiple parts and in particular in two parts, i.e. as a combination of two parts. For example, a first part of the coupling unit 70 and a second part of the coupling unit 70 can each be realized as a coupling unit connecting part 71 or 72, so that in this case the respective coupling unit 70 comprises no bridge sections connecting the coupling unit connecting parts to one another.

As an alternative to the embodiments of the coupling unit 70 described above, otherwise with the combinations of features described, it may be provided that the coupling unit 70 comprises only a first spring device F1 and only a second spring device F2.

Also, the embodiments of the coupling unit 70, otherwise with the described combinations of features of the drive system S, may comprise only one coupling unit connecting part or more than two coupling unit connecting parts.

The embodiments of the coupling unit 70, otherwise with the combinations of features described, can be realized in such a way that one spring section or several spring sections are realized as a loop section or as a spiral spring section or as a disc spring section or in another way as a spring section.

The embodiments of the drive system S according to FIGS. 1 and 2 may comprise an embodiment of the coupling device K which comprises only one coupling unit 70, which is located to the side of the spindle 90 as seen in the direction of the spindle accommodating axis AA.

The embodiments of the coupling device K provided in accordance with the invention ensure that the two drive units 1, 2 are kept stable at a predetermined distance D12, even when they are actuated in operational mode, and that the coupling device K, starting from the neutral state in which no external forces act on the coupling device K, in particular in the direction of the spindle accommodating axis AA, provides a spring travel in opposite directions along the spindle accommodating axis AA.

The drive system S according to the invention may be used in a drive motor M, in which a spindle 90 is inserted in the drive system S.

An embodiment of the drive motor M according to the invention is shown in FIGS. 3 to 8. To manufacture the drive motor M, the embodiment of the drive system S shown in FIGS. 1 and 2 is inserted into a base body B or integrated with it. As shown, the base body B may be formed in such a way that the drive system S is embedded or supported in the base body B. A slide C with a table or a slide connection device C1 is movably supported on the base body B by means of a guide device D. The guide device D is designed in such a way that the slide C can perform a linear movement relative to the base body B. In the embodiment shown, the guide device D is realized by two guide rail combinations D1, D2 arranged laterally with respect to the spindle accommodating axis AA, wherein a respective first guide rail component is attached or formed on the base body B and a second guide rail component is attached or formed on the slide C and wherein both guide rail components provide an adjusting movement of the slide C relative to the base body B in the direction of the spindle accommodating axis AA. The guide device D may also be realized by only one guide rail combination D1 or D2 or realized in another way. Alternatively or additionally, one or both of the guide rail combinations D1, D2 can be designed as an encoder or position sensor, as is the case in FIG. 5 for the second guide rail component D2.

The drive units 1, 2 of the drive motor M can each be actuated by a corresponding electrical actuation signal, with which an actuating component structure 40 in each drive device of the drive system S can set the spindle 90 in rotation or can bring the spindle 90 into a predetermined rotational position. An actuating component structure 40 is in contact with the spindle 90 or a corresponding spindle contact area of the spindle 90 or with several corresponding spindle contact areas of the spindle 90.

In the embodiment of the drive motor M according to the invention as shown in FIGS. 3 to 8, the unambiguous conversion of a rotary movement of the spindle 90 into a predetermined linear movement of the slide C is achieved by an adjusting wall C2 with an adjusting wall surface C3, which is located facing the spindle 90, and by a pretensioning device E, which reaches the adjusting wall C2 and thus the slide C in the direction towards the base body B and thus towards the spindle 90. The base body B comprises a front wall B1, at which a first end 93 of the spindle 90 is located. The slide C comprises an adjusting wall C2, which is located at a second end 94 of the spindle 90. The second end 94 of the spindle 90 is in contact with the adjusting wall C2. The pretensioning device E is fixed on the one hand, in particular with a first end, to the base body B and, on the other hand, in particular with a second end, to the slide C.

The pretensioning device E of the embodiment of the drive motor M according to the invention as shown in FIGS. 3 to 8 is realized by two spiral springs E1, E2 and generally two springs, which extend along each other and also along the spindle accommodating axis AA and are fixed on the one hand to the front wall B1 of the base body B and on the other hand to the adjusting wall C2 of the slide C. In general, the pretensioning device E can also be realized with at least one elastic component that pretensions the base body B and the slide C relative to each other with an attractive force. In this case, the elastic component can be fixed at a position on the base body B and at a position on the slide C, the positions being spaced apart in the spindle accommodating axis AA and exerting a predetermined minimum attractive force when the spindle 90 is in a retracted position. An advantage of this arrangement is that the movement of the slide C on the base body B is decoupled from the movement of the spindle in the drive devices of the drive system S. In particular, jamming of the spindle in the drive devices can thus be avoided.

The coupling of the rotary movement of the spindle 90 and a linear movement of the slide C in an unambiguous manner may also be realized in a different way, for example by a spindle nut screwed onto the spindle 90, which is connected to the slide C in a rotationally fixed manner relative to the spindle 90.

The drive units 1, 2 each comprise a drive device AV with the actuating component structure 40, at least one actuating section or a contact surface section thereof contacting a respective spindle contact area 91 of the spindle 90, as seen in the spindle accommodating axis AA. The respective drive device AV comprises an electrical connection device via which the electrical actuation signal can be supplied to the drive device AV and thus to the respective drive unit 1, 2. The drive device AV converts the actuation signal into an actuating movement of the actuating component structure 40. The actuating movement is realized in such a way that it causes a rotary movement of the spindle 90 in accordance with the actuation signal.

Each drive device AV also comprises at least one actuator device with which at least one actuating section 58*a*, 58*b* or a contact surface section, each of which contacts a spindle contact area of the spindle 90 and can be moved in the circumferential direction of the spindle 90 in order to set the spindle 90 in rotation and drive it.

The drive device AV may also comprise two or more than two actuator devices each comprising an actuating section 58*a*, 58*b* or each comprising a contact surface section, each of which contacting a spindle contact area of the spindle 90, wherein the spindle contact areas of the spindle 90 contact different spindle contact areas of the spindle 90 in the circumferential direction of the spindle 90 and are moved in the circumferential direction of the spindle 90 when the actuator devices are appropriately actuated to rotate and drive the spindle 90.

Two of the at least two actuator devices can be actuated in phase or in antiphase in order to set the spindle 90 in motion.

In particular, to drive the spindle 90, each of the at least one drive devices can be controlled in such a way that a temporal sequence of a slip state and a friction state occurs between the respective actuating section 58*a*, 58*b* or the respective contact surface section and the associated spindle contact area of the spindle 90.

The accuracy of the positioning of the slide C relative to the base body B depends in part on the accuracy with which at least one corresponding actuating section 58 of the actuating component structure 40 of the respective drive device AV contacts a respective spindle contact area 91 of the spindle 90 with respect to the spindle accommodating axis AA.

For this purpose, the coupling device K according to one of the embodiments according to the invention as shown in FIG. 9 can be provided in such a way that the same adjusts a neutral position, unstressed by external forces, of the actuating sections 58*a*, 58*b* of two adjacent drive devices AV in each case, in which the distance between the threaded sections of the respective actuating sections 58*a*, 58*b*, when abutting against corresponding spindle contact areas of the spindle 90, is greater by a fraction of the size of a thread of the spindle thread than would correspond to an exactly matching correspondence of the threaded sections of the respective actuating sections 58 with the threaded section of a respective spindle contact area 91 of the spindle 90 against which the actuating section 58 abuts in each case. This state is shown in FIG. 9. This results in a centering of the threaded sections of the respective actuating sections 58 with the threaded section of a respective spindle contact area 91 of the spindle 90.

This effect is particularly advantageous if the cross-sectional shape of the threads of the threaded sections of the respective actuating sections 58 and of the threaded sections of the respective spindle contact areas 91 of the spindle 90 is triangular or is realized in such a way that their oppositely positioned outer surfaces run at an angle to one another.

FIG. 10 shows the effect of a coupling device K in which the distance between the threaded sections of the respective actuating sections 58*a*, 58*b* is smaller by a fraction of the size of a thread of the spindle thread when they are in contact with corresponding spindle contact areas of the spindle 90.

FIGS. 11 and 12 show that this effect of centering the threaded sections of the respective actuating sections 58 with the threaded section of a respective spindle contact area 91 of the spindle 90 by coupling devices K1, K2 which are attached with a first end to an actuating section 58*a*, 58*b* of the respective drive device AV and with a second end to the base body B, instead of by a coupling device K arranged between the drive devices AV.

FIG. 12 shows a further cross-sectional shape of the threads of the actuating section 58 of the respective drive device AV, which causes the threaded sections of the respective actuating sections 58 to be centered with the threaded section of a respective spindle contact area 91 of the spindle 90. The cross-sectional shape of the threaded sections of the respective actuating sections 58 is trapezoidal, wherein the surface sections extending at an angle to one another are part of the side surfaces of the threads.

FIG. 13 shows, on the basis of a drive system with three drive units 1, 2, 3, a further option for centering the threaded sections of the respective actuating sections 58, 68 or 58*a*, 58*b*, 58*c* or 68*a*, 68*b*, 68*c* with the respective threaded section of a respective spindle contact area 91 of the spindle 90. In this case, the actuating sections 58*a*, 68*a* or 58*b*, 68*b* or 58*c*, 68*c* of at least one of the drive units 1 or 2 or 3 are pressed onto the spindle 90 transversely to the spindle accommodating axis AA from one direction. This measure can also be realized with only two drive systems, e.g. with the drive system of FIGS. 1 and 2, or with more than three drive systems 1, 2, 3. The pressing of at least one of the drive units with its respective actuating section 58 or 68 in the direction of the spindle 90 can be realized by a position-fixing device, e.g. by a tensioning device or by an actuator or by an adjusting device, which is connected to the frame device R of the drive system and the respective actuating section 58*a*, 58*b*, 58*c* or 68*a*, 68*b*, 68*c*. 68*a*, 68*b*, 68*c* or the base body B and the respective actuating section 58*a*, 58*b*, 58*c* or 68*a*, 68*b*, 68*c* for adjusting the position thereof relative to one another.

FIG. 14 shows an embodiment of the drive system S with a coupling device K which, in contrast to the coupling device K described in FIGS. 2 and 3, is realized in such a way that it is able to elastically support three drive units in the spindle accommodating axis AA relative to each other. FIG. 14 shows a drive system S with two drive units 1, 2.

For this purpose, the coupling device K of the embodiment of the drive system S of FIG. 14 comprises spring devices F1, F2 with coupling unit connecting parts 71, 72, which comprise three mounting sections 73*a*, 73*b*, 73*c* or 74*a*, 74*b*, 74*c* located one behind the other in the direction of the spindle accommodating axis AA, which can be fastened, e.g. each can be fastened by means of a connecting device to a frame device 30 of the respective drive device AV, AV1, AV2, wherein in the embodiment shown only two mounting sections 73*a*, 73*c* and 74*a*, 74*c* are each fastened by means of a connecting device to a frame device 30 of the respective drive device AV1 and AV2.

The spring devices F1, F2 of the embodiment of the drive system S according to FIG. 14 thus differ from the spring devices F1, F2 of the embodiment of the drive system S according to FIG. 1 by the shape of the coupling unit connecting parts 71, 72, which each comprise three mounting sections 73*a*, 73*b*, 73*c* or 74*a*, 74*b*, 74*c*, wherein respective two mounting sections, which lie adjacent to each other in the direction of the spindle accommodating axis AA, in each case are connected to each other by a spring section 75*a*, 75*b* or 76*a*, 76*b*. In the embodiment shown, the spring sections 75*a*, 75*b* and 76*a*, 76*b* are formed from three U-shaped sections as shown in FIG. 1. However, the spring sections 75*a*, 75*b* or 76*a*, 76*b* can also be realized in another manner, in particular as mentioned herein.

The drive device AV of the at least one drive unit 1, 2 can be designed in various ways.

An embodiment of a drive device AV, which can be used in at least one drive unit 1, 2, is shown in FIG. 16 and is designated therein by the reference sign 201, and comprises a frame device 230 with a first tensioning device 231, with a second tensioning device 235, with a first actuator support part 251 and with a second actuator support part 261. The frame device 230 of the drive device AV may be inserted into the base body B of a drive system S.

The actuator device 201 herein may generally comprise an actuator 13 or 23 or may consist of an actuator 13 or 23. For example, the actuator device 10, 20 may comprise the actuator 13 or 23 and an at least partial external coating of the actuator 13 or 23. Alternatively or additionally, the actuator device 10, 20 may comprise the actuator with or without at least partial external coating and a housing surrounding the actuator 13 or 23 with or without at least partial external coating. Such a housing can be designed in such a way that it pretensions or additionally pretensions the actuator 13, 23.

The actuator 13, 23 is a piezo actuator, i.e. an actuator 13, 23 consisting of piezoelectric and in particular piezoceramic material or comprising piezoelectric and in particular piezoceramic material. Actuators made of another electromechanical material are also conceivable. In general, any form of actuator is conceivable, for example hydraulically or pneumatically operated actuators, or actuators made of a shape memory material.

The drive device AV, 201 is provided for driving a spindle 90 with a spindle axis A90. To accommodate the spindle 90, the drive device AV, 201 comprises a spindle space 39 which extends along a longitudinal axis of the spindle space. For this purpose, embodiments of the drive device AV according to FIGS. 16 and 17 are comprising:

- the first actuator device 10 with a first end 11, with a second end 12 and with a first actuator 13, the extension of which can be reversibly changed when actuated along a first actuator axis $L_1$, wherein the first end 11 and the second end 12 are oriented in opposite directions to one another with respect to the first actuator axis $L_1$ and wherein the first actuator axis $L_1$ extends transversely to the spindle axis A90 of a spindle 90,
- the second actuator device 20 with a first end 21, with a second end 22 and with a second actuator 23, the extension of which can be reversibly changed along a second actuator axis $L_2$ when electrically actuated, wherein the first end 21 and the second end 22 are oriented in opposite directions to one another with respect to the first actuator axis $L_1$ and wherein the first actuator axis $L_1$ and the second actuator axis $L_2$ extend along one another,
- the actuating component structure 40, 240 and
- the frame device 30, which provides a spindle space 39 for receiving the spindle 90.

The actuating component structure 240 of the drive device 201 comprises: a first actuator functional part 255 comprising a first actuator surface section 254 and a second actuator functional part 265 comprising a second actuator surface section 264, the actuator surface sections 254, 264 being arranged opposite to each other and together forming a spindle space 239 therebetween.

The first actuator device 10 is located between the first actuator support part 251 and the first actuator functional part 255, wherein the first actuator support part 251 and the first actuator functional part 255 each lie directly or indirectly via an intermediate component against opposite ends 11 and 12, respectively, of the first actuator device 10. For example, the first end 11 is in contact with the first actuator support part 251 and the second end 12 is in contact with the first actuator functional part 255. The first actuator support part 251, the first actuator functional part 255 and the first actuator device 10 form a first actuating structure 250.

The second actuator device 20 is located between the second actuator support part 261 and the second actuator functional part 265, wherein the second actuator support part 261 and the second actuator functional part 265 each lie directly or indirectly via an intermediate component against opposite ends 21 and 22 of the second actuator device 20. For example, the first end 21 is in contact with the second actuator support part 261 and the second end 22 is in contact with the second actuator functional part 265. The second actuator support part 261, the second actuator functional part 265 and the second actuator device 20 form a second actuating structure 260.

The actuating surface sections 254, 264 may comprise the features of a variant of an actuating surface section described herein and, in particular, can be concavely curved when viewed from the spindle space 239. The curvatures are formed in the circumferential direction defined with respect to the spindle axis A90 and are suitable for each of these to lie flat against the spindle surface 90*a*.

The first actuator support part 251 comprises a first base section 252 and an adjoining first support section 253. The first actuator functional part 255 comprises a first mounting section 256 and a first actuating section 258 and a first connecting section 257 connecting these. The first support section 253 abuts the first end 11 of the first actuator device 10, and the first connecting section 257 abuts the second end 12 of the first actuator device 10. The first base section 252 and the first mounting section 256 are attached to a first end section 233 of the tensioning device 231 by means of a connecting element 233*s*. Here, the first actuator support section 251 and the first actuator functional section 255 may be configured such that the first support section 253 exerts a pressure on the first end 11 and the first connecting section 257 exerts a pressure on the second end 12 to compress the first actuator device 10 from both ends 11, 12 thereof. In a variant of the actuating component structure 240, the first mounting section 258 may be omitted and the first connecting section 257 may be attached to the second end 12. A first actuating section 258 extends from the first connecting section 257 along the first actuator axis $L_1$. The first actuating section 258 comprises a surface section 259, which is located facing the spindle space 239. The first actuating surface section 254 is located in the actuating surface 259. This may generally comprise features described herein with reference to other actuating surface sections, and in particular may be realized as a friction surface with respect to a surface section surrounding the actuating surface 259.

In an analogous manner, the second actuator support part 261 comprises a second base section 262 and an adjoining second support section 263. The second actuator functional part 265 comprises a second mounting section 266 and a second actuating section 268 and a second connecting section 267 connecting these. The second support section 263 abuts the first end 21 and the second connecting section 267 abuts the second end 22 of the second actuator device 20. The second base section 262 and the second mounting section 266 are attached to the second end section 234 of the tensioning device 231 by means of a connecting element 234*s*. Here, the second actuator support section 261 and the second actuator functional section 265 may be configured such that the second support section 263 exerts a pressure on the first end 21 and the second connecting section 267 exerts a pressure on the second end 12 to compress the second actuator device 20 from both ends 21, 22 thereof.

In a variant of the actuating component structure 240, the second mounting section 266 may be omitted and the second connecting section 267 may be attached to the second end 22. A second actuating section 268 extends from the second connecting section 267 along the second actuator axis $L_2$. The second actuating section 268 comprises a surface section 269 which is located facing the spindle space 239. The second actuating surface section 264 is located in the actuating surface 269. This may generally comprise features described herein with reference to other actuating surface sections, and in particular may be realized as a friction surface with respect to a surface section surrounding the actuating surface 269.

The surface sections 259, 269 face each other and are opposite each other. Similarly, the actuating surface sections 254, 264 face each other and are opposite each other.

The first tensioning device 231 biases the first actuating section 258 and the second actuating section 268 in a resilient manner from two opposite sides towards the spindle space 239 and towards the spindle 90, respectively.

Similarly, the second tensioning device 235 connects the first base section 252 of the first actuator support member 251 and the second base section 262 of the second actuator support member 261.

The drive device AV, 201 can also be realized without a second tensioning device 235. The frame device 230 can also be implemented in a different manner. The frame device 230 may also be omitted and the first mounting section 256 and the second mounting section 257 may be fastened directly to one another in sections of the base body frame device R opposite one another with respect to the spindle accommodating axis.

The integration or insertion of the drive device AV, 201 into the base body frame device R may also be carried out in other ways, for example by means of the connecting elements 233*s*, 234*s* on opposite sections of the base body frame device R with respect to the spindle accommodating axis.

In any embodiment of the drive device AV, 201 according to the invention with all other features otherwise described herein and alternative features, if any, the first tensioning device 231 and the second tensioning device 235 may be attached to each other and in this way form a circumferential frame device 230. It may be provided that the first actuator support member 251 and the first actuator functional member 255 are spaced apart or attached together to at least one of the tensioning devices 231, 235. It may also be provided that the second actuator support part 261 and the second actuator functional part 265 are spaced apart from each other or are attached together to at least one of the tensioning devices 231, 235.

In the embodiments of the drive device 200 described herein, the frame device 230 with the first tensioning device 235 and the second tensioning device 235 is thus designed as a structurally continuous component which completely surrounds the spindle space 239, the first actuator device 10 and the second actuator device 20 in the circumferential direction defined by the longitudinal axis of the spindle space.

In particular, it can be advantageous if the first base section 252 and the first actuator support section 253 as well as the second base section 262 and the second actuator support section 263 each form a lever. This causes the forces exerted by the second tensioning device 235.

(D1) that the first actuator support section 253 presses the first actuator device 10 against the first actuator functional part 255 or the first connecting section 257, thereby biasing the first actuator device 10 and the first actuator functional part 255 with the first actuating section 258;

(D2) that the second actuator support section 263 presses the second actuator device 20 against the second actuator functional part 265 or the second connecting section 267, thereby biasing the second actuator device 20 and the second actuator functional part 265 with the second actuating section 268.

In the embodiment of the actuator device 1, 201 according to the invention as shown in FIG. 16, the connecting section 257 of the first actuator functional part 255, which abuts against the second end 12 of the first actuator device 10, extends laterally towards the spindle space 239 and away from the first mounting section 256 of the first actuator support part 251. Also, in the embodiment of FIG. 10, the first actuating section 258 extends from the connecting section 257 along the first actuator axis $L_1$ and the first actuating surface section 254 extends at least in sections along the first actuator axis $L_1$. Further, the connecting section 267 of the second actuator functional part 265, which abuts against the second end 12 of the second actuator device 20, extends laterally towards the spindle space 239 and away from the second mounting section 266 of the second actuator support part 261. Also, in the embodiment of FIG. 10, the second actuating section 268 extends from the connecting section 267 along the second actuator axis $L_2$ and the second actuating surface section 264 extends at least in sections along the second actuator axis $L_2$. Thus, the first and second actuating surface sections 254, 264 form surface areas that are located differently from one another when viewed in the direction of the spindle space longitudinal axis. Likewise, the surface normal directions of points of at least one region of actuating surface sections 254, 264 define an angular region that contains the direction of a vertical of the first actuator axis $L_1$ or the second actuator axis $L_2$ or both actuator axes $L_1$, $L_2$.

In the embodiment of the drive device 1, 201 according to the invention as shown in FIG. 16, the first actuating section 258 and the second actuating section 268 are each designed as a free end of the first mounting section 256 or of the second mounting section 266, which is only mounted fixedly in terms of movement on the respective connecting section 257 or 267 or is connected to the respective connecting section 257 or 267. In particular, the first mounting section 256 and the second mounting section 266 can be resiliently mounted on the respective connecting section 257 or 267. As a result of the aforementioned features (D1), (D2), the first actuating section 258 and the second actuating section 268 are thus each pressed resiliently against the spindle 90 in order to optimize the driving of the spindle 90.

As an alternative to these embodiments, the actuator device 1, 201 according to the invention can also be realized in such a way that the actuating sections 258, 268 are mounted on the respective actuator support part 251 or 261, so that the respective actuating surface section 254, 264, depending on the design of the actuating sections 258 and 268, presses less or not resiliently against the spindle 90.

As shown in FIG. 16, the second tensioning device 235 may be curved or substantially curved in the region between the first end section 237 and the second end section 238. In particular, the connecting section 236 may be curved or substantially curved. Irrespective of this, the second tensioning device 235 can comprise an overall plate-shaped or bow-shaped design. In particular, the connecting section 236 comprises a curvature in the area that does not abut the first end section 237 and the second end section 238. As shown in FIG. 10, this may be a uniform curvature, so that it does not comprise an inflection point. According to FIG. 10, the curvature is concavely curved when viewed from the spindle space 239. Alternatively, the connecting section 236 can also be convexly curved. In this way, the connecting section 236 biases the first actuating section 258 and the second actuating section 268 in a resilient manner from two opposite sides towards the spindle space 239 or towards the spindle 90.

An actuation of at least one of the actuator devices 10, 20 of the drive motor 200 according to FIG. 16 causes, as in the embodiments described above, a relative movement of the first actuating surface section 254 along the first actuator axis $L_1$ or of the second actuating surface section 264 along the second actuator axis $L_2$ or both of these relative movements. Due to the contact of the actuating surface sections 254, 264 with the spindle surface 90*a*, at least one of the two actuating surface sections 254, 264 drives the spindle 90 in a predetermined direction of rotation controlled in accordance with the actuation signals. In the case in which only one of the actuator devices 10, 20 is actuated, only that actuating surface section 254 or 264 drives the spindle 90 which is functionally connected to the respectively actuated actuator device 10 or 20. When the actuator devices 10, 20 are simultaneously actuated in opposite directions, the actuating surface sections 254, 264 drive the spindle 90 in the same direction of rotation in a time interval corresponding to the circumferential direction in which the actuating surface sections 254 and 264 move the first spindle contact area 91 and the second spindle contact area 92.

FIGS. 14 and 15 and 17 show a variant according to the invention of the embodiments of the drive motor M or 200 according to the invention described herein with reference to FIG. 16. The embodiment of the drive motor 200 according to the invention shown in FIG. 17 shows the features described with reference to FIG. 16. Since the features of this embodiment comprise the same or similar functions as the features of the drive motor 200 shown in FIG. 14, the same reference signs as in FIG. 16 are used for the respective corresponding features in FIG. 17.

In contrast to the embodiments of the drive motor 200 according to the invention shown in FIG. 16, the drive motor 200 of FIG. 17 comprises connecting sections 232 and 236 which are convexly curved as seen from the spindle space 239.

In addition, in contrast to the embodiment of the drive motor M or 200 according to the invention shown in FIG. 16, in the embodiment of the drive motor M or 200 according to the invention shown in FIG. 17, the first actuator support parts 251, 261 are each formed in a block-like manner.

The drive devices of FIGS. 16 and 17 are realized in such a way that a relatively small deformation of the second end 22 of the second actuator 23 causes a larger displacement or displacement amplitude of the second actuating surface section 264, which in particular can be larger by a factor of 1.1 or by a factor of 1.2 than the respective associated movement of the second end 22 of the second actuator 23. This also applies analogously to the deformation of the second end 21 of the first actuator 13 and the displacement or displacement amplitude of the first actuating surface section 254.

The actuating component structure 240 is designed in one piece and comprises a coupling section 280 for this purpose. Alternatively, the actuating component structure 240 may also be designed in one piece, i.e. without the coupling section 280. The coupling section 280 comprises a first end section 281, a second end section 282 and a connecting section 283, which connects the first end section 281 and the second end section 282 to one another. The first end section 281 is connected to an outer end section 285 of the first actuating section 258, as seen from the first connecting section 257 or, as seen from the first tensioning device 231, via a first transition section 287, in particular in a dimensionally stable or resilient manner. The second end section 282 is connected to an outer end section 286 of the second actuating section 268, as seen from the second connecting section 267 or, as seen from the first tensioning device 231, via a second transition section 288, in particular in a dimensionally stable manner. In this way, the spindle 90 is located between the connecting section 283 and the first tensioning device 231.

As shown in FIG. 17, the cross-sections of the transition sections 287, 288 are reduced relative to the actuating sections 258, 268 and their end sections 285, 286 and relative to the connecting section 283 of the coupling section 280 when viewed along the longitudinal axis of the spindle space or the spindle axis A90. In the embodiment of the drive motor 200 shown in FIG. 19, this results in a resilient connection of the connecting section 283 to the first actuating section 258 and the second actuating section 268.

Here, as shown in FIG. 17, the second tensioning device 236 may be designed to be dimensionally stable, so that it does not deform or only deforms insignificantly when the actuators 13, 23 are actuated. FIG. 22 shows that a resilient pretension of the actuating sections 258, 268 against the spindle 90 is achieved by the one-piece design of the actuating component structure 240. Thus, it is also achieved that the arrangement of the frame device 230 and the actuating component structure 240 resiliently biases the first actuator device 10 along the first actuator axis $L_1$ and the second actuator device 20 along the second actuator axis $L_2$ and thereby provides a resilient bias of the actuating component structure 240 in the direction of the spindle space 239.

FIGS. 18 and 19 show examples of voltage signals S31, S32 with which embodiments of the drive motor 200 described with reference to FIG. 16 or 17 can be actuated and adjustment movements of the spindle 90 can be carried out. The times T31, T32, T33, T34, T35, T36 indicated therein are entered for illustrative purposes.

In general, the first voltage signal S31 and the second voltage signal S32 are each periodic and, between two relative extremes that are adjacent to each other, comprise a section with a gradient that is greater according to amount than the largest gradient according to amount that occurs between two relative extremes that are adjacent to each other and precede or follow the aforementioned extremes in time. The respective pairs of relative extrema can be directly adjacent in time. However, the respective pairs of relative extrema do not comprise to be directly adjacent in time, but several pairs of extrema with a greater gradient, preferably with the same gradient sign, but also with different gradient signs, may also directly follow one another, before or after a pair of relative extrema with a smaller gradient.

In the context of the waveforms of the first voltage signal S11 and the second voltage signal S12, "greater gradient according to amount" herein means a gradient at which at least intermittent slippage occurs between the first actuating surface section 254 and the first spindle contact area 91 which is in contact therewith and between the second actuating surface section 264 and the second spindle contact area 92 which is in contact therewith, since the movement of the actuating surface sections 254, 264 does not overcome the inertia of the spindle 90 or overcomes it less than the movements of the actuating surface sections 254, 264 in a section with a "smaller gradient according to amount" due to the respective given coefficients of friction relative to the respective spindle contact area 91, 92.

To cause an actuating movement of the spindle 90 in the direction of rotation DR (FIG. 17), the gradient of the first voltage signal S31 between a first relative minimum at a time T31 and a next temporally subsequent relative maximum at a time T33 is greater according to amount than the gradient of the first voltage signal S31 between this relative maximum at the time T33 and the next temporally subsequent relative minimum at the time T35. The gradient between the points in time T31 and T33 can be greater by a factor of at least 1.05 than between the points in time T33 and T35.

At the same time, to cause an actuating movement of the spindle 90 in the direction of rotation DR (FIG. 17), the gradient of the second voltage signal S32 between a first relative maximum at the time T31 and a next relative minimum at the time T33 is greater according to amount than the gradient of the second voltage signal S32 between this relative minimum at the time T33 and the next relative maximum at the time T33.

FIGS. 20 and 21 show an embodiment of the drive system S, which comprises two drive systems according to FIG. 14 arranged one behind the other in the spindle accommodating axis AA, which are mounted on the base body B. The central mounting sections 73*b* and 74*b* of the spring devices F1, F2 are used to connect the same to the base body B. Alternatively, these could also be used to attach a drive device AV.

FIG. 22 shows an embodiment of the drive system S with a coupling device K which, like the coupling device K described with reference to FIG. 14, is realized in such a way that it can elastically support three drive units 1, 2, 3 in the spindle accommodating axis AA relative to one another. The coupling device K is realized like the coupling device K of FIG. 14, whereby according to FIG. 22 the two coupling unit connecting parts 71, 72 are realized as separate components. The coupling device K comprises two spring sections 75 and 76.

In contrast to the embodiment of the drive system S according to FIG. 14, the embodiment of the drive system S according to FIG. 22 comprises three drive devices AV1, AV2, AV3, which are realized according to one of the embodiments of FIGS. 23 to 28. The coupling device K comprises two spring sections 75, 76. Each spring section 75, 76 comprises two spring subsections 75*a*, 75*b* and 76*a*, 76*b*, respectively, each subsection being located between two respective drive devices. As shown in FIG. 22, the spring sections 75, 76 can be realized in one piece, with the three drive devices AV1, AV2, AV3 being attached to the spring section 75 or 76 at points distributed over the longitudinal direction of the respective spring section 75 or 76 extending along the spindle accommodating axis AA and, in particular, evenly distributed. The coupling device K thus comprises no bridge section, since its connecting function is performed by the drive devices AV1, AV2, AV3.

The embodiment of the drive system S according to FIG. 22 may comprise one or two further spring sections which are identical in construction with the spring sections 75, 76 and which are each located point-symmetrically to the spring sections 75 or 76 with respect to the AA.

The drive devices AV1, AV2, AV3 are mounted in the support device 5.

FIG. 22 shows an embodiment of the drive system S according to the invention, in which three drive devices AV, AV1, AV2, AV3 are integrated, which are shown in FIGS. 23 to 28. In each of the embodiments of the drive device, which are described below with reference to FIGS. 23 to 28, at least one actuator device is integrated. Each actuator device provided for this purpose is formed according to one of the embodiments of the actuator devices described hereinbefore and to which the reference sign "10" or the reference sign "20" is assigned hereinbefore.

Also, each embodiment of the drive device described below with reference to FIGS. 23 to 28 may comprise a control device which is electrically connected to each of the respective drive devices and which, in an activated state, sends a periodic actuation signal to the respective drive device.

The drive device according to FIG. 23, to which the reference sign 501 is assigned in the following, comprises a frame device 30, which may form a drive system S together with at least one other drive device. At least one actuator device is integrated in each of these drive devices.

The frame device 30 is realized as a drive housing 530 with a housing wall 533, which defines a housing interior 536 surrounded by and formed in the latter. The frame device 30 can also be realized in another way. An actuating component structure 40 provided according to the invention is arranged in the housing interior 536, to which the reference sign 540 is assigned in the embodiment of the drive device 501 of FIG. 23. The actuating component structure 540 comprises:

an actuating spindle nut 541, the interior of which defines a spindle space 539 with a spindle accommodating axis AA extending centrally therethrough, and which comprises a spindle nut outer surface 541*a* and an internal thread 542 which contacts a circumferential spindle contact area 91 of the spindle 90, and a entrainment device 550, with which the actuating spindle nut 541 is set in rotation as a result of actuation of the at least one actuator device.

In the embodiments of the drive devices described herein with reference to FIGS. 23 to 28, the internal thread 542 or the inner surface of the actuating spindle nut 541 forming the same forms an actuating surface section 543, which is in contact with the external thread or the spindle surface 90*a* of a spindle 90 received by the spindle space 539 and which, when the respective drive device is correspondingly actuated with actuation signals which are transmitted from a control device to the respective drive device, causes a rotary movement of the spindle 90 in cooperation with the spindle 90 inserted into the spindle space 539. In particular, a temporal sequence of a slip state and a friction state between the actuating surface section 543 and the spindle 90 can be realized with corresponding actuation signals. Such actuation signals are described herein with reference to FIGS. 18 and 19.

Optionally, the actuating component structure 540 comprises a restoring device 560 that provides a restoring force against a rotation of the actuating spindle nut 541 due to the actuation of the at least one actuator device.

The actuating spindle nut 541 or the internal thread 542 thus defines a spindle space 539 with a spindle accommodating axis AA, the position and location of which is identical or essentially identical to a spindle axis A90 of a spindle 39 inserted into the spindle space 539 and to be driven by the drive device 501 and to which the reference sign 539*a* is assigned herein. For the further description of the drive device 501 with such an actuating spindle nut, two circumferential directions running in opposite directions to one another are defined, each of which corresponds to the circumferential direction of a fictitious cylindrical lateral surface which contacts the internal thread 542. The circumferential directions are corresponding directions of movement of a fictitious point of the actuating spindle nut 541 when the actuating spindle nut 541 rotates. Radial directions are also defined with these circumferential directions, which result from a respective radius on the cylindrical lateral surface.

In the structural integration of embodiments of the drive device 501 described herein with reference to FIG. 23, together with at least one further drive device in a drive system S, the spindle 90 is screwed into the actuating spindle nut 541, as shown in FIG. 22. FIG. 22 shows a drive system S according to the invention with three drive devices 501 as shown in FIG. 23 and with a spindle 39 which is screwed into the three drive devices 501.

Cross-sectional shapes result from the drive housing 530, which in each case result when viewed in the direction of the spindle accommodating axis 539*b* and which in each case comprise an essentially constant shape in the embodiment shown due to different cuts along the spindle accommodating axis 539*b*. The drive housing 530 can also be realized differently in variants of this embodiment and in particular comprise cross-sectional shapes that are not constant.

The drive housing 530 of the drive device 501 comprises a circumferential housing wall 533 with an outer housing surface 531 which, according to the embodiments of the drive housing 530 shown, essentially comprises the shape of a circular cylindrical surface when viewed in the direction of the spindle accommodating axis AA and is formed from four circular cylindrical sections 531*a*, 531*b*, 531*c*, 531*d* and four straight-surface sections 532*a*, 532*b*, 532*c*, 532*d*, which are arranged alternately one behind the other in the circumferential direction over the outer housing surface 531 of the housing. In the embodiment shown, the straight-surface sections 532*a*, 532*b*, 532*c*, 532*d* are provided as contact surfaces in order to be able to mount a coupling device K of a drive system S and, in particular, a support device 5 on the housing 530.

The drive housing 530 and in particular its outer housing surface 531 can each comprise any shape that is expedient or advantageous for integration together with at least one further drive device and a coupling device K in a drive system S, in particular with regard to efficient manufacture and operational use of the drive device 501. In particular, the drive housing 530 does not have to be realized circumferentially, i.e. its outer side can also be formed from several outer surfaces, i.e. interrupted or discontinuous in the circumferential direction.

The actuating spindle nut 541 of the embodiments of the drive devices according to FIGS. 23 to 28 is substantially cylindrical in shape. Alternatively, the actuating spindle nut 541 may comprise any other convenient or advantageous shape for the efficient manufacture and operational use of the drive device 501.

The entrainment device 550 is generally realized as at least one contact surface section of the actuating spindle nut 541. The contact surface section can be a surface of a component of the actuating spindle nut 541. The respective contact surface section is oriented along the circumferential direction of the spindle nut. The contact surface section or the entrainment device 550 is in contact with the at least one actuator device at a respective outer end formed in its longitudinal direction, as viewed from the spindle accommodating axis 539*a*, and transmits each deformation of the at least one actuator device in its respective longitudinal direction to the actuating spindle nut 541 and thereby sets it in rotation.

At least one actuator device 610 is located between the at least one entrainment device 550 and the drive housing 530, wherein the longitudinal direction L610 of the respective actuator device 610 extends along the circumferential directions and, in particular, transversely to the longitudinal extent of a respective contact surface section of the entrainment device 550 or the longitudinal extent of the respective entrainment device 550. The actuator device 610 comprises an actuator 613 or is identical thereto. Each of the at least one actuator device 610 or each of the at least one actuator 613 is electrically connected to a control device, which sends actuation signals to the respective one of the at least one actuator device, which expands or contracts depending on the actuation signal. When the actuator device 610 expands or contracts due to a corresponding actuation signal in the longitudinal direction L610, the actuating spindle nut 541 is rotated relative to the drive housing 530 in one of two mutually opposite circumferential directions.

The embodiments of the drive device 501 shown in FIG. 23 comprise a single actuator device, which is assigned the reference sign 610 herein. For each of the at least one actuator device, which comprises the embodiments according to FIGS. 23 to 28, a longitudinal direction of the respective actuator device is defined such that the respective actuator device expands or contracts along the longitudinal direction based on corresponding command signals.

Furthermore, the embodiments of the drive device 501 according to the invention comprise two entrainment devices 550, to which the reference signs 551, 552 are also specifically assigned in FIGS. 23 to 28. In general, each of the entrainment devices 550 provided according to the invention can be formed as struts or radially extending arms. In the embodiments of the drive device 501 shown in FIGS. 23 to 28, a first entrainment device 551 is realized as a first arm or a first entrainment strut 555 and a second entrainment device 552 is realized as a second arm or a second entrainment strut 556. The driving struts 555, 556 are each connected to the spindle nut 540 at a connection area **555*a* or 556*a* of the spindle nut 540 opposite the spindle accommodating axis AA and extend in their longitudinal direction radially from the outer surface 540*a* of the spindle nut 540 and outwards in mutually opposite directions with respect to the spindle accommodating axis AA. The longitudinal direction of the respective entrainment device 550 or entrainment strut or generally the extension of the respective contact surface section of the actuating spindle nut 541 extends transversely to the longitudinal direction L610 of the respective actuator device 610 and transversely to the circumferential directions of the spindle nut 540. The outer end 555*a* of the first driving strut 555, as seen from the spindle nut 540, is located at a distance from the housing 530 or from an inner surface section 533*a* of the housing wall 533 facing the first driving strut 555 and the spindle nut 540 in the radial direction. The outer end 556*a* of the second driving strut 556, as seen from the spindle nut 540, is also located at a distance from the housing 530 or from an inner surface section 533*b* of the housing wall 533 facing the latter and the spindle nut 540 in the radial direction. In this way, the driving struts 555, 556 together with the actuating spindle nut 541 are movable in the circumferential direction relative to the drive housing 530. The drive housing 530 can comprise two recesses 545, 546, in each of which one of the driving struts 555, 556 partially extends. The first drive strut 555 extends in a first recess 545, so that the outer end 555*a* is located in the first recess 545, and the second drive strut 556 extends in a second recess 546, so that the outer end 556*a* is located in the second recess 546**.

Both driving struts 555, 556 are formed as parts or components of the spindle nut 540 and can, as shown, be manufactured or realized in one piece with the spindle nut 540. Alternatively, one of the drive struts 555, 556 or both of the drive struts 555, 556 may each be realized as separate parts that are attached to a base part of the spindle nut 540 that comprises the internal thread 542. The embodiments of the drive device 501 shown comprise a first driving strut 555 and a second driving strut 556, which are each realized as a dimensionally stable strut or dimensionally stable beam.

The embodiments of the actuating section 501 described herein with reference to FIGS. 23 to 28 can also be realized without the first driving strut 555 or without the second driving strut 556, or both without the first driving strut 555 and without the second driving strut 556. In each of these cases, the actuating spindle nut 541 comprises at least one contact surface section **555*c* extending in the radial direction and oriented generally along the circumferential direction, and the housing wall 533 comprises at least one contact surface section 545*c*. In this context, the term "dimensionally stable" means that the forces and torques which occur in operational use in each of the respective drive devices described herein with reference to FIGS. 23 to 28 by actuation of the at least one actuator device of a respective drive device cause, at most, deformations of the first support strut 555 and the second support strut 556 which are small or negligible compared to the deformations and movements of the respective actuator devices when they are actuated or controlled and compared to the drive movements of the actuating spindle nut 541** caused thereby.

The embodiments of the drive device 501 described herein with reference to FIGS. 23 to 28 comprise an actuator device 610 which is located between the first driving strut 555, generally an contact surface section **555*c*, and the housing wall 533 and is supported by the latter in such a way that the longitudinal direction L610 of the actuator device 610 extends along the circumferential direction. In this case, the actuator device 610 rests on the one hand on a contact surface section 555*c* of the first driving strut 555 or the actuating spindle nut 541 extending in the radial direction or as a contact surface section of a component part which is attached to the actuating spindle nut 541 or connected to the actuating spindle nut 541, and on the other hand on a contact surface section 545*c* of the housing wall 533 extending in the radial direction. The actuator device 610 is realized according to one of the actuator devices 10, 20 described herein in particular with reference to FIG. 16 and comprises an actuator 613 with a longitudinal axis L610 which extends along the circumferential direction of the drive device 501, so that, when the actuator device 610 expands, the distance between the contact surface section 555*c* and the contact surface section 545*c* increases and, when the actuator device 610 contracts, this distance decreases. In particular, the actuator device 610 can be identical to the actuator 613. Thus, when the actuator device 610 is actuated with an actuation signal according to FIG. 18 or FIG. 19, in which the edges of an oscillation comprise different gradients relative to one another, a friction-slip effect is achieved, with which a relative rotation of a spindle 39, which is inserted in the internal thread 542 of the actuating spindle nut 541**, can be achieved.

In the embodiments of the drive devices described herein with reference to FIG. 23, the drive devices can also be realized only with the first entrainment strut 555 and not with the second entrainment strut 556.

In general, the embodiments of the drive devices according to the invention, which are described herein with reference to FIGS. 23 to 28, may be configures such that an actuator device or an actuator in each case bears against mutually opposite sides of at least one entrainment strut or a component part with its first end with respect to its longitudinal direction, the longitudinal direction of which runs transversely to the longitudinal direction of the entrainment strut or the component part, the actuator devices or actuators bearing against a respective surface of the actuator housing at their second end with respect to their longitudinal direction. As a result, the actuator devices or actuators can drive or actuate the actuating device 540 in pairs, in particular if the increase in length and decrease in length of the respective actuator device or the respective actuator take place in opposite directions due to electrical actuation signals. In this way, a time-dependent actuation of the actuating device 540 can take place in both drive directions. The embodiments of the actuator devices described herein with reference to FIGS. 23 to 28 further comprise a reset device 560 by which the actuator spindle nut 541 is coupled to the actuator housing 530, wherein the reset device 560 permits rotations of the actuator spindle nut 541 about an axis of rotation which extends along the spindle accommodating axis AA. For this purpose, the restoring device 560 can be realized in any manner that is suitable for the respective intended operational use of the drive device 501.

In general, the restoring device 560 is only provided optionally, i.e. the drive devices described herein with reference to FIGS. 23 to 28 may also be realized without restoring device 560.

The embodiments of the drive device 501 shown in FIGS. 23 to 28 comprise a restoring device 560 with two connecting parts 563, 564, which are located on opposite sides of the spindle nut 540 as seen in the spindle accommodating axis 539*a*. The connecting parts 563, 564 of the embodiments of the drive devices according to FIGS. 23 to 28 are each realized as a spar. Each connecting part 563, 564 extends in the radial direction from a connecting area 563*a* or 564*a* of the actuating spindle nut 541 to a connecting area 563*b* or 564*b* of the drive housing 530. The connecting areas 563*a* and 564*a* of the actuating spindle nut 541 and the connecting areas 563*b* or 564*b* of the drive housing 530 are arranged opposite one another, in each case with respect to the spindle accommodating axis AA. Each of the connecting parts 563, 564 is arranged between two driving struts 555, 556 in the circumferential direction.

Each connecting part 563, 564 is preferably realized as an elastic connection between the actuating spindle nut 541 and the drive housing 530. Each connecting part 563, 564 is preferably realized from an elastic material. Each connecting part 563, 564 may be realized in another way than by a tie bar, for example an elastic band.

The embodiments of the drive device 501 of FIGS. 23 to 28 may also comprise only one of the connecting parts 563, 564.

Optionally, as shown in FIGS. 23 to 28, in order to realize a sufficient length of each respectively provided connecting part 553, 554, in particular as an elongated connecting part and, for example, in the form of a spar or a band, a respective housing recess 565, 566 may be formed in the radial direction on the inner side of the actuator housing 530 facing the actuator spindle nut 541, in which the respective connecting part 563, 564 partially extends on the side of the actuator housing 530. The greater the length of each respective connecting part 563, 564 provided, the lower the elasticity of the material of the respective connecting part 563, 564 can be in order to effect the same angle of rotation of the actuating spindle nut 541 with the same force exerted by the at least one actuator device on the actuating spindle nut 541.

As an alternative to the realization of the drive device 501 according to FIGS. 23 to 28, the restoring device 560, with or without the at least one connecting part 563, 564, can also be realized by a single solid-state joint or by several solid-state joints, i.e. by at least one solid-state joint. The embodiments of the drive device 501 shown in FIGS. 23 to 28 comprise a solid-state joint device with two solid-state joints 561, 562, each of which may also be referred to as a structural joint.

In each of the embodiments described herein, the restoring device 560 can be realized in particular as a resilient mounting of the actuating spindle nut 541 on the drive housing 530. In particular, this resilient mounting may be provided in such a way that, from a neutral position of the actuating spindle nut 541 relative to the drive housing 530, a rotary movement in each of the mutually opposite circumferential directions causes a restoring force to the neutral position, the strength of which depends on the magnitude of the angle of rotation of the respective rotary movement.

To this end, alternatively or additionally, the restoring device 560 may be realized as a combination of a pivot joint, which may be realized as a hinge joint, and a spring, for example a coil spring. Generally, the restoring device 560 provides a rotation about an axis extending along the spindle accommodating axis AA, wherein the restoring device 560 provides a restoring force which is proportional to the relative rotation angle between the actuating spindle nut 541 and the drive housing 530.

In general, the embodiment of the drive device 501 may comprise a drive housing 530 with a housing wall 533, on which at least one actuating surface section 545*c* extending in a radial direction is realized, which is oriented in a first circumferential direction of the actuating spindle nut 541. The drive device 501 may comprise an actuating spindle nut 541, which forms a spindle space 539 with a spindle accommodating axis 539*a* and defines a radial direction of the drive device 501, wherein the actuating spindle nut 541 comprises a contact surface section 555*c* (FIG. 23), which is oriented along a second circumferential direction of the actuating spindle nut 541, which is directed opposite to the first circumferential direction, wherein the one contact surface section 555*c* of the actuating spindle nut 541 and a respective contact surface section 545*c* of the housing wall (533), which is oriented along the second circumferential direction of the actuating spindle nut 541, are located facing each other. In this case, the embodiment of the drive device 501 comprises at least one actuator device 610, which bears with a first end 11 or 611 against the contact surface section 545*c* of the housing wall 533 and with a second end 12 or 612 against the contact surface section 555*c* of the actuating spindle nut 541, wherein the longitudinal direction of the at least one actuator device 610 extends from the first end 11 to the second end 12.

FIGS. 25 and 26 illustrate a drive device, which is assigned the reference sign 701 herein. This drive device and the embodiments described herein on the basis of FIGS. 25 and 26 are based or are based on the embodiments of the drive device described herein on the basis of FIGS. 23 and 24, so that for the description of the embodiments described herein on the basis of FIGS. 25 and 26, corresponding features and combinations of features are not specifically described again and their reference signs are adopted.

This drive device and the embodiments described herein with reference to FIGS. 25 and 26 comprise a frame device 30 which, together with at least one further drive device, can form a drive system S. At least one actuator device is integrated in each of these drive devices.

The embodiment of the drive device 701 shown in FIGS. 25 and 26 comprises a first actuator device 610 and a second actuator device 620. The longitudinal axis L610 of the first actuator device 610 and the longitudinal axis L620 of the second actuator device 620 each extend along and, in particular, in the circumferential direction.

As described with reference to FIG. 23, the first actuator device 610 rests on the one hand, i.e. with a first end, on the contact surface section 555*c* of the first entrainment strut 555 and on the other hand, i.e. with a second end, on a contact surface section 545*c* of the housing wall 533 extending in the radial direction. The second actuator device 620 rests on the one hand, i.e. with a first end, on a contact surface section 556*c* of the second entrainment strut 556 extending in the radial direction and on the other hand, i.e. with a second end, on a contact surface section 546*c* of the housing wall 533 extending in the radial direction. In this case, the first actuator device 610 and the second actuator device 620, as seen in the spindle accommodating axis AA, are located on sides of their respective driving struts 555, 556, which are oriented in the same direction, and are arranged opposite one another with respect to the spindle accommodating axis AA.

The actuator devices 610, 620 are realized according to one of the actuator devices 10, 20 described herein, in particular with reference to FIG. 16, and each comprises an actuator 613 or 623 with a longitudinal axis L610 or L620, respectively, which each extend along the circumferential direction of the drive device 501. The actuators 613 and 623 can each be realized as piezo actuators. The actuator axes L610, L620 run along each other. When the actuator device 610 expands, the distance between the contact surface section 555*c* and the contact surface section 545*c* increases and, when the actuator device 610 contracts, this distance decreases. When the actuator device 620 expands, the distance between the contact surface section 556*c* and the contact surface section 546*c* increases, and when the actuator device 610 contracts, this distance decreases. The actuator devices 610, 620 can in particular be identical to the respective actuator 613, 623.

When the actuator device 610 or the actuator device 620 is actuated by an actuation signal as shown in FIG. 18 or FIG. 19, in which the edges of an oscillation comprise different gradients with respect to each other, a friction slip effect can be achieved between the actuating surface section 543 and the spindle surface 90*a* of the spindle 90, with which a relative rotation of a spindle 39 inserted in the internal thread 542 of the actuating spindle nut 541 can be achieved.

The embodiment of the drive device 701 of FIGS. 25 and 26 comprises a housing wall 533 with at least two actuating surface sections 545*c*, 546*c* extending in a radial direction, one of which is oriented along a first circumferential direction of the actuating spindle nut 541 and another of which is oriented along a second circumferential direction of the actuating spindle nut 541, which is oriented in the opposite direction to the first circumferential direction of the actuating spindle nut 541. The actuating spindle nut 541 comprises at least two contact surface sections 555*c*, 556*c*, one of which is oriented along the second circumferential direction of the actuating spindle nut 541 and another of which is oriented along the first circumferential direction of the actuating spindle nut 541, wherein the at least one contact surface section of the actuating spindle nut 541 and a respective one of the at least one contact surface section 545*c* of the housing wall 533, which is oriented along the circumferential direction of the actuating spindle nut 541, are located facing each other. Furthermore, the drive device 701 comprises a first and a second actuator device 610, 620, each of which comprises a first end 11 or 611, 621 attached to one of the contact surface sections 545*c*, 546*c* of the housing wall 533 and a second end 12 or 612, 622 attached to a respective one of the contact surface sections 545*c*, 546*c* of the housing wall 533, 612, 622 on a respective contact surface section 555*c*, 556*c* of the actuating spindle nut 541, wherein the respective contact surface section 555*c*, 556*c* of the actuating spindle nut 541 and the respective contact surface section 545*c*, 546*c* of the housing wall 533, on which a respective actuator rests, lie opposite one another.

In particular, at least two actuating surface sections 545*c*, 546*c* of the housing wall 533 extend in the radial direction and are oriented facing away from each other with respect to each of the circumferential directions, wherein the actuating spindle nut 541 comprises two entrainment devices 550, 551, 552 each comprising an contact surface section 555*c*, 556*c* extending in the radial direction and oriented facing each other with respect to each of the circumferential directions, wherein a respective actuating surface section 545*c*, 546*c* of the housing wall 533 and a respective contact surface section 555*c*, 556*c* of the actuating spindle nut 541 are opposite each other, wherein the first and a second actuator device 610, as viewed in the direction of the spindle accommodating axis 539*a*, abut against a respective contact surface section 555*c*, 556*c* of the entrainment devices 550 and against a respective one of the contact surface sections 555*c*, 556*c* of the actuating spindle nut 541.

Alternatively, as shown in FIGS. 27 and 28, the actuator device 801 may comprise at least two actuator surface sections 545*c*, 546*c* of the housing wall 533 extending in a radial direction and facing each other, the actuator spindle nut 541 which comprises an entrainment device 550 located at least in sections between the actuator surface sections 545*c*, 546*c* of the housing wall 533 and which comprises two contact surface sections 555*c*, 555*d* which are oriented in opposite directions to one another, wherein the first and a second actuator device 610, viewed in the direction of the spindle accommodating axis 539*a*, abut on opposite sides of the entrainment device 550 against a respective one of the contact surface sections 555*c*, 555*d* thereof.

For operational use, it may be provided that the first actuator device 610 and the second actuator device 620 are controlled with the actuation signals described with reference to FIG. 18 and FIG. 19, so that they are controlled in antiphase and alter in antiphase between a temporary slip state and a friction state.

For operational use, it can also be provided that the periodic actuation signals to the first actuator device 610 and the second actuator device 620 of the pair of actuator devices 610, 620 run in antiphase and alternate in antiphase between a respective temporary slip state and a friction state, wherein the successive edge sections of different sign of the same half-period of the two periodic actuation signals cause an expansion and contraction of the first actuator device 610 and the second actuator device 620 in antiphase and thus corresponding actuation of the contact surface section 5456*c* and the contact surface section 546*c*, thereby exerting movements of the actuating surface section 543 in the same circumferential direction of the spindle 90. The movements of the actuating surface section 543 occur in their temporal sequence in such a way that a slip state is followed by a friction state, or vice versa, between the actuating surface section 543 and the spindle surface 90*a* of the spindle 90.

FIGS. 27 and 28 illustrate a drive device, which is assigned the reference sign 801 herein. This drive device and the embodiments described herein with reference to FIGS. 25 and 26 are based or based on the embodiments of the drive device described herein with reference to FIGS. 23 and 24, so that in order to describe the embodiments described herein with reference to FIGS. 27 and 28, corresponding features and combinations of features are not specifically described again and their reference signs are adopted.

This drive device and the embodiments described herein with reference to FIGS. 27 and 28 comprise a first actuator device 610, a second actuator device 620, a third actuator device 630 and a fourth actuator device 640. The longitudinal axis L610 of the first actuator device 610, the longitudinal axis L620 of the second actuator device 620, the longitudinal axis L630 of the third actuator device 630 and the longitudinal axis L640 of the fourth actuator device 640 each extend along and in particular in the circumferential direction. In addition to the arrangement of the first actuator device 610 and the second actuator device 620 between a respective driving strut 555 or 556 and a respective contact surface section of the housing wall 533, as described with reference to FIGS. 25 and 26, the third actuator device 630 abuts, on the one hand, a second contact surface section 555*d* of the first driving strut 555 extending in the radial direction and, on the other hand, an contact surface section 545*d* of the housing wall 533 extending in the radial direction, which faces the contact surface section 555*d*. The third actuator device 630 and the fourth actuator device 630 are located on the same side of their respective driving struts 555, 556, as seen in the spindle accommodating axis AA.

The second contact surface section 555*d* of the first entrainment strut 555 is oriented in the opposite direction to the first contact surface section 555*c* of the first entrainment strut 555. Furthermore, the fourth actuator device 640 additionally bears, on the one hand, against a second contact surface section 556*d* of the second entrainment strut 556 extending in the radial direction and, on the other hand, against a contact surface section 546*d* of the housing wall 533 extending in the radial direction and facing the contact surface section 556*d*. The second contact surface section 556*d* of the second entrainment strut 556 is oriented in the opposite direction to the first contact surface section 556*c* of the second entrainment strut 556.

For operational use, it may in particular be provided that the drive device 801 of FIGS. 27 and 28 comprises a control device which is electrically connected to two pairs of actuator devices. In principle, the two pairs of actuator devices can be formed from any possible combination of two groups of two actuator devices 610, 620, 630, 640 in each case:

- A first pair of actuator devices may be the combination of actuator devices 610 and 620 and a second pair of actuator devices may be the combination of actuator devices 630 and 640.
- A first pair of actuator devices may be the combination of actuator devices 610 and 630 and a second pair of actuator devices may be the combination of actuator devices 620 and 640.
- A first pair of actuator devices may be the combination of actuator devices 610 and 640 and a second pair of actuator devices may be the combination of actuator devices 620 and 630.

For operational use, it can be provided in particular that the control device in an activated state sends a periodic actuation signal to a first actuator device and to a second actuator device of each of the two pairs of actuator devices 610, 620, 630, 640, which comprises at least one half-period of successive edge sections of different sign, the maximum gradients of which comprise a minimum difference according to amount to one another, wherein the periodic actuation signals to the respective first actuator devices and to the respective second actuator devices of the respective pairs of actuator devices 610, 620, 630, 640 run in antiphase and alternate in antiphase between a respective temporary slip state and a friction state, wherein the successive edge sections of different sign of the same half-period of the two periodic actuation signals exert movements of the actuating surface section 543 in the same circumferential direction of the spindle 90.

It can therefore be provided, for example, that the first actuator device 610 and the third actuator device 630 are driven with the same actuation signals and the second actuator device 620 and fourth actuator device 640 are driven with the same actuation signals, whereby, for example the first actuator device 610 and the third actuator device 630 are controlled with the actuation signals according to FIG. 18 and the second actuator device 620 and fourth actuator device 640 are controlled with the actuation signals according to FIG. 19 or vice versa, so that the actuator devices are controlled in pairs in antiphase and alternate in antiphase between a respective temporary slip state and a friction state. They can also be controlled in pairs in other ways.

The embodiments of the drive devices 501, 701, 801 described herein with reference to FIGS. 23 to 28 may generally comprise actuator devices according to an embodiment described herein. In particular, each of the actuator devices may comprise an actuator 13 comprising a first end 11 and a second end 12. The first end 11 may contact a respective contact surface section of the housing wall 533 and that at the second end 12 may contact a contact surface section of the spindle nut 540 or vice versa, the expansion and contraction thereof being reversibly variable upon actuation along a first actuator axis $L_1$, wherein the first end 11 and the second end 12 are oriented in opposite directions with respect to the respective actuator axis and wherein the respective actuator axis may extend transversely to the spindle accommodating axis 539*a* and along the actuating surface section 543 of the spindle nut 540.

In any of the embodiments, the contact surface section may be realized on the actuating spindle nut 541 or the instead of on a entrainment strut.

LIST OF REFERENCE SYMBOLS

1 drive unit
1*a* spindle space
1*b* spindle accommodating axis
2 drive unit
2*a* spindle space
2*b* spindle accommodating axis
3 drive unit
5 support device
7*a* lateral bracket
7*b* lateral bracket
8*a* lateral bracket
8*b* lateral bracket
10 first actuator device
11 first end of the first actuator 13
12 second end of the first actuator 13
13 first actuator
20 second actuator device
21 first end of the second actuator 23
22 second end of the second actuator 23
23 second actuator
30 frame device
39 spindle space
40 actuating component structure
51 first actuating surface section
52 second actuating surface section
58 actuating section
58*a* actuating section
58*b* actuating section
58*c* actuating section
68*a* actuating section
68*b* actuating section
68*c* actuating section
70 coupling unit
71 coupling unit connection part
72 coupling unit connection part
73*a* first mounting section
73*b* second mounting section

73*c* second mounting section
74*a* first mounting section
74*b* second mounting section
74*c* second mounting section
75 spring section
75*a* spring subsection
75*b* spring subsection
76 spring section
76*a* spring subsection
76*b* spring subsection
77*a* first U-shaped section
77*b* second U-shaped section
77*c* third U-shaped section
78*a* first U-shaped section
78*b* second U-shaped section
78*c* third U-shaped section
79*a* first bridge section
79*b* second bridge section
90 spindle
90*a* spindle surface of spindle 90
91 first spindle contact area of the spindle 90
92 second spindle contact area of the spindle 90
93 first end of the spindle 90
94 second end of the spindle 90
95 spindle actuating part
96 spindle adjusting part
200 drive motor
201 drive unit
230 frame device
231 first tensioning device
232 connecting section
233 first end section
233*s* connecting element
234 second end section
234*s* connecting element
235 second tensioning device
236 connecting section
237 first end section
238 second end section
239 spindle space
240 actuating component structure
250 first actuating structure
251 first actuator support part
252 first base section of the first actuator support part 251
253 actuator support section of the first actuator support part 251
254 first actuating surface section
255 first actuator function part
256 first mounting section of the first actuator support part 251
257 first connecting section
258 first actuating section
259 actuating surface of the first actuator function part 255
260 second actuating structure
261 second actuator support part
262 second base section of the second actuator support part 261
263 actuator support section of the second actuator support part 261
264 second actuating surface section
265 second actuator functional part
266 second mounting section
267 second connecting section
268 second actuating section
269 actuating surface of the second actuator function part 265
280 coupling section
281 first end section of the coupling section 280
282 second end section of the coupling section 280
283 connecting section of the coupling section 280
285 outer end section of the first actuating section 258
286 outer end section of the second actuating section 268
287 first transition section between the first end section 285 and the connecting section 283
288 second transition section between the second end section 286 and the connecting section 283
501 drive device
530 drive housing
531 outer housing surface of the housing 530
531*a* circular cylindrical section of the outer surface 531
531*b* circular cylindrical section of the outer surface 531
531*c* circular cylindrical section of the outer surface 531
531*d* circular cylindrical section of the outer surface 531
532*a* straight section of the outer surface 531
532*b* straight section of the outer surface 531
532*c* straight section of the outer surface 531
532*d* straight section of the outer surface 531
533 housing wall
533*a* inner surface section of the housing wall 533
533*b* inner surface section of the housing wall 533
533*c* contact surface section of edge section 533
533*d* contact surface section of edge section 533
536 housing interior
539 spindle space
540 actuating component structure
541 actuating spindle nut
541*a* spindle nut outer surface
542 internal thread
542*a* inner surface forming the internal thread 541
543 actuating surface section of actuating component structure 540
545 first recess of the drive housing 530
545*c* contact surface section of the housing wall 533
545*d* contact surface section of the housing wall 533
546 second recess of the drive housing 530
546*c* contact surface section of the housing wall 533
546*d* contact surface section of the housing wall 533
550 entrainment device
555 first entrainment strut
555*a* outer end of the first entrainment strut [[545]]555
555*c* contact surface section of the first entrainment strut 545
556 second entrainment strut
556*a* outer end of the second entrainment strut [[546]]556
560 resetting device
563 connecting part
563*a* connecting area
563*b* connecting area
564 connecting part
564*a* connection area
564*b* connection area
610 actuator device
613 actuator of the actuator device 610
620 actuator device
623 actuator of the actuator device 620
630 actuator device
633 actuator of the actuator device 630
640 actuator device
643 actuator of the actuator device 640
A adjustment system
AA spindle accommodating axis
AV drive unit
AV1 drive unit AV2 drive unit
AV3 drive unit
A90 spindle axis
B base body
C slide
C1 slide connection device
C2 adjusting wall
C3 adjusting wall surface
D guide device
D1 guide rail combination
D2 guide rail combination
D12 distance
F spring device
F1 spring device
F2 spring device
K coupling device
K1 coupling device
K2 coupling device
$L_1$ first actuator axis or longitudinal direction of the actuator device 10
$L_2$ second actuator axis or longitudinal direction of the actuator device 20
L610 actuator axis or longitudinal direction of the actuator device 610
L620 actuator axis or longitudinal direction of the actuator device 620
L630 actuator axis or longitudinal direction of the actuator device 630
L640 actuator axis or longitudinal direction of the actuator device 640
M drive motor
RS direction of rotation of the spindle 90 in FIG. 17
S drive system
S11 voltage signal
S12 voltage signal
S21 voltage signal
S22 voltage signal
T11 time of a relative minimum of the voltage signal S11 and a relative maximum of the voltage signal S12
T12 time of a reference value or zero crossing of the voltage signal S11 and S12
T13 time of a relative maximum of the voltage signal S11 and a relative minimum of the voltage signal S12
T14 time of a reference value or zero crossing of the voltage signal S11 and S12
T15 time of a relative minimum of the voltage signal S11 and a relative maximum of the voltage signal S12
T16 time of a reference value or zero crossing of the voltage signal S11 and S12
T21 time of a relative minimum of the voltage signal S21 and a relative maximum of the voltage signal S22
T22 time of a reference value or zero crossing of the voltage signal S21 and S22
T23 time of a relative maximum of the voltage signal S21 and a relative minimum of the voltage signal S22
T24 time of a reference value or zero crossing of the voltage signal S21 and S22
T25 time of a relative minimum of the voltage signal S21 and a relative maximum of the voltage signal S22
T26 time of a reference value or zero crossing of the voltage signal S21 and S22
S31 voltage signal
S32 voltage signal
T31 time of a relative minimum of the voltage signal S31 and a relative maximum of the voltage signal S32
T32 time of a reference value or zero crossing of the voltage signal S31 and S32
T33 time of a relative maximum of the voltage signal S31 and a relative minimum of the voltage signal S32
T34 time of a reference value or zero crossing of the voltage signal S31 and S32
T35 time of a relative minimum of the voltage signal S31 and a relative maximum of the voltage signal S32
T36 time of a reference value or zero crossing of the voltage signal S31 and S32

The invention claimed is:

1. A drive system comprising:

at least two drive units each for accommodating and driving a spindle with a spindle axis, wherein each of the drive units for accommodating a respective section of the spindle comprises a respective spindle space which extends in a respective spindle accommodating axis through each of the drive units, which extends in the direction of the spindle axis, wherein the at least two drive units stably support the spindle, a coupling device which elastically couples the at least two drive units to one another in the direction of the spindle accommodating axis, the coupling device comprising at least one spring device which extends along the spindle accommodating axis, and wherein the at least one spring device in each case in an unstressed neutral state, in which no spindle (90) is accommodated in the drive system, keeps the two drive units in each case stable at a predetermined distance and provides a respective spring travel from the neutral state in mutually opposite directions along the spindle accommodating axis.

2. The drive system according to claim 1, wherein the coupling device comprises two coupling unit connecting parts each with at least one spring section, wherein the coupling unit connecting parts are each connected to the at least two drive units on opposite sides of the spindle accommodating axis as viewed in a direction transverse to the spindle accommodating axis.

3. The drive system according to claim 2, wherein the spring sections of the coupling unit connection parts each comprise a meander section for providing a spring travel in mutually opposite directions along the spindle accommodating axis.

4. The drive system according to claim 2, wherein the at least one coupling device comprises two coupling units which, viewed in a direction transverse to the spindle accommodating axis, are each located on opposite sides of the spindle accommodating axis and extend along one another, wherein each of the coupling units respectively comprises two coupling unit connection parts which are connected to both drive units and each of which comprise a spring section for providing a spring travel in opposite directions to each other, wherein the two coupling units each extend transversely to the spindle accommodating axis and along one another.

5. The drive system according to claim 1, wherein each drive unit comprises a drive device with a spindle space, wherein each drive unit comprises a frame device, the respective frame devices being coupled to one another by means of the coupling device, wherein at least one drive device comprises an actuating component structure for contacting and driving a spindle which partially delimits the spindle space, and wherein the at least one drive device comprises at least one actuator device which, when actuated accordingly, moves the actuating component structure in such a way that a spindle accommodated by the actuating component structure can be driven.

6. The drive system according to claim 5, wherein the at least one drive device comprises an actuator device which is realized as an electric motor, and the actuating component structure comprises a drive spindle nut which is rotatably mounted in the drive device and is thereby fixed in the direction of the spindle accommodating axis, wherein the drive spindle nut can be screwed onto the spindle such that, when the actuator device is actuated accordingly, the drive spindle nut and thereby, due to frictional contact with the spindle, the spindle are set in rotation.

7. The drive system according to claim 5, wherein the at least one drive device comprises at least one actuator device with at least one actuator which is realized as a piezo actuator.

8. The drive system according to claim 5, wherein the at least one drive device comprises at least one actuator device with at least one actuator which is realized as a piezo actuator, wherein the drive system comprises a control device which is electrically connected to each of the at least one drive device and which in an activated state sends to the respective drive device a periodic actuation signal which comprises at least one half-period of successive edge sections of different sign, the maximum gradients of which have a minimum difference according to amount to one another, which cause movements of the actuating component structure and, through this, alternately a slip state and a friction state between an actuating surface section of the actuating component structure, which contacts the spindle, and the spindle.

9. The drive system according to claim 5, wherein the at least one drive device comprises at least one pair of actuator devices, each of which comprises an actuator which is realized as a piezo actuator with an actuator axis, wherein the at least one drive device comprises an actuating component structure which can be brought into contact with the surface of a spindle, wherein the actuator axes extend along one another and the extension of each actuator device can be reversibly changed along its actuator axis with corresponding electrical control and the change in extension of the actuators sets the actuating component structure in motion and causes a spindle accommodated by the actuating component structure to rotate, and the change in extension of the actuators sets the actuating component structure in motion and a spindle accommodated by the actuating component structure can be set in rotation.

10. The drive system according to claim 5, wherein the at least one drive device comprises at least one pair of actuator devices, each of which comprises an actuator which is realized as a piezo actuator with an actuator axis, wherein the at least one drive device comprises an actuating component structure which can be brought into contact with the surface of a spindle, wherein the actuator axes extend along one another and the extension of each actuator device can be reversibly changed along its actuator axis with corresponding electrical control and the change in extension of the actuators sets the actuating component structure in motion and causes a spindle accommodated by the actuating component structure to rotate, and the change in extension of the actuators sets the actuating component structure in motion and a spindle accommodated by the actuating component structure can be set in rotation, wherein the drive system comprises a drive device which is electrically connected to each pair of actuator devices of the at least one drive device and which, in an activated state, sends to a first actuator device and a second actuator device of the pair of actuator devices in each case a periodic actuation signal, which transmits at least one half-period successive edge sections of different edge sections of the pair of actuator devices of the pair of actuator devices a periodic actuation signal which comprises at least one half-period of successive edge sections of different sign, the maximum gradients of which having a minimum difference according to amount from one another, wherein the actuating component structure comprises at least one actuating surface section which is in contact with the spindle and, when the respective actuator devices of the pair of actuator devices are actuated, can set the spindle in motion in the circumferential direction in each case with the periodic actuation signal, and wherein the periodic actuation signals to the first actuator device and the second actuator device of the respective pair of actuator devices run in antiphase and alternate in antiphase between a respective temporary slip state and a friction state, wherein the successive edge sections of different sign of the same half-period of the two periodic actuation signals exert movements of the at least one actuating surface section in the same circumferential direction of the spindle.

11. The drive system according to claim 5, wherein the at least one drive device comprises at least one pair of actuator devices, each of which comprises an actuator which is realized as a piezo actuator with an actuator axis, wherein the at least one drive device comprises an actuating component structure which can be brought into contact with the surface of a spindle, wherein the actuating component structure comprises a first actuating section comprising a first actuating surface section and a second actuating section comprising a second actuating surface section, and wherein, when the first actuator device of the respective pair of actuator devices is actuated with an actuation signal, it sets the first actuating surface section in motion and, when the second actuator device of the respective pair of actuator devices is actuated with an actuation signal, it sets the second actuating surface section in motion.

12. The drive system according to claim 5, wherein the at least one drive device comprises at least one pair of actuator devices, each of which comprises an actuator which is realized as a piezo actuator with an actuator axis, wherein at least one drive device comprises an actuating component structure which can be brought into contact with the surface of a spindle, wherein the actuating component structure comprises a first actuating section comprising a first actuating surface section and a second actuating section comprising a second actuating surface section, wherein the first actuating section is connected to an end of a first actuator device and the second actuating section is connected to an end of a second actuator device, and wherein the actuating surface sections are located opposite one another, in at least one section in each case, and delimit the respective spindle space and contact the spindle contact area of a spindle accommodated by the actuating component structure in order to drive the latter.

13. The drive system according to claim 2 in combination with a spindle, wherein the spindle includes a spindle axis, and wherein the spindle is located in each spindle space and is coupled to the drive units for driving the spindle.

14. The drive system according to claim 13, wherein at least one drive device comprises an actuating component structure which partially delimits the spindle space and is in contact with the spindle for receiving and driving the spindle, and wherein the at least one drive device comprises at least one actuator device which, when actuated accordingly, moves the actuating component structure in such a way that the spindle accommodated by the actuating component structure is driven.

15. The drive system according to claim 13 in combination with a slide coupled to the spindle:

wherein the at least one spring device in each case in an unstressed neutral state, in which no spindle (90) is accommodated in the drive system, keeps the two drive units in each case stable at a predetermined distance (12) and provides a respective spring travel from the neutral state in mutually opposite directions along the spindle accommodating axis.

16. The drive device according to claim 2, comprising:

a drive housing with a housing wall, on which at least one actuating surface section extending in the radial direction is realized, which is oriented in a first circumferential direction of the actuating spindle nut, an actuating spindle nut, the actuating spindle nut forming a spindle space with a spindle accommodating axis and defining a radial direction of the drive device, wherein the actuating spindle nut comprises at least one contact surface section oriented along a second circumferential direction of the actuating spindle nut which is directed opposite to the first circumferential direction, wherein the at least one contact surface section of the actuating spindle nut and a respective one of the at least one contact surface section of the housing wall, which is oriented along the second circumferential direction of the actuating spindle nut, are located facing each other, and at least one actuator device, which with a first end contacts the contact surface section of the housing wall and with a second end contacts the contact surface section of the actuating spindle nut, the longitudinal direction of the at least one actuator device extending from the first end to the second end.

17. The drive device according to claim 16, wherein the housing wall comprises at least two actuating surface sections extending in a radial direction, one of which is oriented along a first circumferential direction of the actuating spindle nut and another of which is oriented along a second circumferential direction of the actuating spindle nut, which is oriented opposite to the first circumferential direction of the actuating spindle nut, wherein the actuating spindle nut comprises at least two contact surface sections, one of which is oriented along the second circumferential direction of the actuating spindle nut and another of which is oriented along the first circumferential direction of the actuating spindle nut, wherein the at least one contact surface section of the actuating spindle nut and a respective one of the at least one contact surface section of the housing wall, which is oriented along the circumferential direction of the actuating spindle nut, are located facing each other, and wherein the drive device comprises a first and a second actuator device, each of which bears with a first end against one of the contact surface sections of the housing wall and with a second end against a respective contact surface section of the actuating spindle nut, wherein the respective contact surface section of the actuating spindle nut and the respective contact surface section of the housing wall, against which a respective actuator rests, lie opposite one another.

18. The drive device according to claim 16, wherein at least two actuating surface sections of the housing wall extend in a radial direction and are oriented away from each other with respect to each of the circumferential directions, wherein the actuating spindle nut comprises two entrainment devices each comprising a contact surface section extending in the radial direction and oriented to face each other with respect to each of the circumferential directions, wherein an actuating surface section of the housing wall (533) and an contact surface section of the actuating spindle nut are opposed to each other, respectively, and wherein the first and a second actuator device, viewed in the direction of the spindle accommodating axis, each abut against a respective contact surface section of the entrainment devices and against a respective one of the contact surface sections of the actuating spindle nut.

19. The drive device according to claim 16, wherein at least two actuating surface sections of the housing wall extend in a radial direction and lie opposite one another, wherein the actuating spindle nut comprises an entrainment device which is located at least in sections between the actuating surface sections of the housing wall and which comprises two contact surface sections which are oriented in opposite directions to one another, and wherein the first and a second actuator device, as viewed in the direction of the spindle accommodating axis, contact a respective one of the contact surface sections of the entrainment device on opposite sides thereof.

20. The drive device according to claim 16, wherein the drive device comprises a restoring device which, from a neutral position of the actuating spindle nut relative to the drive housing, causes a rotational movement in each of the mutually opposite circumferential directions to produce a restoring force to the neutral position, the strength of which depends on the magnitude of the angle of rotation of the respective rotational movement.

* * * * *